United States Patent

Benson, Jr. et al.

[19]

[11] Patent Number: 6,157,486
[45] Date of Patent: *Dec. 5, 2000

[54] RETROREFLECTIVE DICHROIC REFLECTOR

[75] Inventors: Olester Benson, Jr., Woodbury; Michael F. Weber, Shoreview, both of Minn.; John A. Wheatley, Ascott, United Kingdom; Andrew J. Ouderkirk, Woodbury, Minn.; Benjamin T. Fellows, Port Townsend, Wash.; Wilson C. Garland; Mel Y. Wong, both of Minneapolis, Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/006,579

[22] Filed: Jan. 13, 1998

[51] Int. Cl.[7] ........................................ G02B 5/30

[52] U.S. Cl. ........................ 359/498; 359/497; 359/530; 359/589

[58] Field of Search ..................... 359/497, 498, 359/530, 584, 589, 590

[56] References Cited

U.S. PATENT DOCUMENTS

| | | | |
|---|---|---|---|
| 2,568,126 | 9/1951 | Keeley | 154/123 |
| 3,124,639 | 3/1964 | Kahn | 88/65 |
| 3,610,729 | 10/1971 | Rogers | 350/157 |
| 3,711,176 | 1/1973 | Alfrey, Jr. et al. | 350/1 |
| 3,860,036 | 1/1975 | Newman, Jr. | 138/45 |
| 4,099,838 | 7/1978 | Cook et al. | 350/105 |

(List continued on next page.)

FOREIGN PATENT DOCUMENTS

| | | |
|---|---|---|
| 469732 | 2/1992 | European Pat. Off. . |
| 573905 | 12/1993 | European Pat. Off. ........ G02B 27/28 |
| 606939 | 7/1994 | European Pat. Off. ...... G02F 1/1335 |
| WO 93/05434 | 3/1993 | WIPO . |
| WO 95/27919 | 4/1995 | WIPO ............................. G02B 27/28 |
| WO 95/17303 | 6/1995 | WIPO ............................. B32B 7/02 |
| WO 95/17691 | 6/1995 | WIPO ............................. G02B 5/30 |
| WO 95/17692 | 6/1995 | WIPO ............................. G02B 5/30 |
| WO 95/17699 | 6/1995 | WIPO ............................ G02F 1/1335 |
| WO 96/19347 | 12/1995 | WIPO ............................. B32B 7/02 |
| WO 96/17263 | 6/1996 | WIPO . |
| WO 97/01440 | 1/1997 | WIPO ............................. B32B 27/36 |
| WO 97/01774 | 1/1997 | WIPO ............................. G02B 1/10 |
| WO 97/11353 | 3/1997 | WIPO ............................. G01N 21/38 |
| WO 97/26561 | 7/1997 | WIPO ............................. G01V 8/10 |
| WO 97/32226 | 9/1997 | WIPO ............................. G02B 5/30 |
| WO 97/41484 | 11/1997 | WIPO ............................ G02F 1/1335 |

OTHER PUBLICATIONS

Schrenk et al., Nanolayer polymeric optical films, Tappi Journal, pp. 169–174, Jun., 1992.

IBM Corp., IBM Technical Disclosure Bulletin, vol. 33, No. 1B. Jun. 1990.

Wesolowicz, et al., Laser Search & Rescue System, Presented at the Third International Airborne Remote Sensing Conference and Exhibition, Jul. 1997.

*Primary Examiner*—Darren Schuberg
*Attorney, Agent, or Firm*—Stephen C. Jensen

[57] ABSTRACT

Various combinations of retroreflective sheeting and multilayer polymeric reflective films are disclosed. The reflective film includes alternating layers of at least a first and second polymer, the alternating layers being configured to exhibit a high reflectance for light within a first spectral range and a low reflectance for light within a second spectral range. At least two of the alternating layers can have out-of-plane indices of refraction which differ by no more than 50% of the maximum in-plane refractive index difference. The polymeric layers can define optical repeating units arranged in a sequence to have a specific thickness profile designed to give sharpened spectral transitions. The retroreflective layer preferably exhibits retroreflectance in all planes of incidence, but alternately it can be retroreflective in at least one plane of incidence but not in at least one other plane of incidence.

35 Claims, 21 Drawing Sheets

U.S. PATENT DOCUMENTS

| | | | |
|---|---|---|---|
| 4,149,304 | 4/1979 | Brynjegard | 29/148 |
| 4,175,775 | 11/1979 | Kruegle | 283/7 |
| 4,268,117 | 5/1981 | Sevelin | 350/105 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,720,426 | 1/1988 | Englert et al. | 428/344 |
| 4,906,070 | 3/1990 | Cobb, Jr. | 350/286 |
| 5,103,337 | 4/1992 | Schrenk et al. | 359/359 |
| 5,188,760 | 2/1993 | Hikmet et al. | 252/299.01 |
| 5,200,851 | 4/1993 | Coderre et al. | 359/351 |
| 5,211,878 | 5/1993 | Reiffenrath et al. | 252/299.63 |
| 5,235,443 | 8/1993 | Barnik et al. | 359/37 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,339,198 | 8/1994 | Wheatley et al. | 359/359 |
| 5,387,953 | 2/1995 | Minoura et al. | 353/20 |
| 5,389,324 | 2/1995 | Lewis et al. | 264/171 |
| 5,422,756 | 6/1995 | Weber | 359/487 |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,559,634 | 9/1996 | Weber | 359/638 |
| 5,568,316 | 10/1996 | Schrenk et al. | 359/584 |
| 5,612,820 | 3/1997 | Schrenk et al. | 359/498 |
| 5,624,731 | 4/1997 | Desjardins | 428/143 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

RETROREFLECTIVE DICHROIC REFLECTOR

CROSS REFERENCE TO RELATED APPLICATIONS

This application relates to the following U.S. patent applications, filed on even date herewith, assigned to the same assignee as the present application, and incorporated herein by reference: "Optical Film With Sharpened Bandedge", U.S. patent application Ser. No. 09/006,085; "Color Shifting Film", U.S. patent application Ser. No. 09/006,591 "Process For Making Multilayer Optical Film", U.S. patent application Ser. No. 09/006,288 "Reflective Article With Concealed Retroreflective Pattern", U.S. patent application Ser. No. 09/006,292.

BACKGROUND

The present invention relates generally to articles such as sheeting having distinctive reflective properties. The invention has particular application to polymeric mirrors, polarizers, and retroreflectors.

The term "retroreflective" as used herein refers to the attribute of reflecting an obliquely incident light ray in a direction antiparallel to its incident direction, or nearly so, such that it returns to the light source or the immediate vicinity thereof. The term "dichroic" refers to the separation of light into at least two spectral components by selectively reflecting light in a first wavelength range and selectively transmitting light in a second wavelength range. The term "mirror" as used herein refers to an extended body that specularly reflects on-axis linearly polarized light substantially the same regardless of the orientation of the linear polarization with respect to an axis in the plane of the body. The term "polarizer" as used herein refers to an extended body that transmits on-axis linearly polarized light substantially differently depending on the orientation of the linear polarization with respect to an axis in the plane of the body. Other terms are defined in the glossary at the end of the specification.

PCT Publication No. WO 95/17692 (Ouderkirk et al.), incorporated herein by reference, discloses multilayer polymeric films configured as reflective polarizers in combination with various structured surface materials which confine light to a relatively narrow viewing zone. Multilayer films having birefringent layers are discussed, including films where the out-of-plane refractive indices of adjacent layers are matched. Structured surface materials include those having a plurality of triangular prisms as well as symmetric cube corner sheeting. A discussion of the multilayer films configured as mirrors is also included, including an infrared reflecting mirror with on-axis transmission of over 80% from 400 to 700 nm with a dip in transmission (increased reflectance) for some wavelengths greater than 700 nm.

U.S. Pat. No. 4,175,775 (Kruegle) discloses a photo I.D. card with a photographic image hidden behind a filter region and placed in front of a high gain retroreflective material. The filter region absorbs virtually all of the light impinging on it, and may comprise a half-silvered mirror but "advantageously comprises" a filter material which transmits infrared or ultraviolet light but blocks substantially all visible light.

PCT Publication No. WO 97/11353 (Wesolowicz et al.) discloses a laser-based target detection system applicable to search and rescue operations. Specially prepared retroreflective elements are discussed in which a base retroreflective element reflects laser energy at a first wavelength but affects an optical property separate from the reflection at the first wavelength. In the case of a sheet retroreflector, a protective polymer layer is disclosed which is conducive to be doped with a dye to provide the spectrally sensitive coating. Alternative wavelength discriminating materials discussed include a dielectric stack.

Two known types of retroreflective sheeting are microsphere-based sheeting and cube corner sheeting. Microsphere-based sheeting, sometimes called "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. Nos. 3,190,178 (McKenzie), 4,025,159 (McGrath), and 5,066,098 (Kult). Cube corner retroreflective sheeting comprises a body portion typically having a substantially planar front surface and a structured rear surface comprising a plurality of cube corner elements. Each cube corner element comprises three approximately mutually perpendicular optical faces. Examples include U.S. Pat. Nos. 1,591,572 (Stimson), 4,588,258 (Hoopman), 4,775,219 (Appledorn et al.), 5,138,488 (Szczech), and 5,557,836 (Smith et al.). It is known to apply a seal layer to the structured surface in a regular pattern of closed polygons which form isolated, sealed cells to keep contaminants away from individual cube corners. Heat and pressure used to form the cells destroys or deforms cube corner elements located along the polygon boundaries.

Flexible cube corner sheetings such as those disclosed in U.S. Pat. No. 5,450,235 (Smith et al.) are also known and can be incorporated in embodiments described below.

There is a continuing need for articles with novel reflective characteristics which can be made in large sheets at relatively low unit cost. Such articles can be incorporated in a variety of end use applications such as authentication, conspicuity, personal safety, search and rescue, toys, games, and decorative articles.

BRIEF SUMMARY

Disclosed herein are combination reflective/retroreflective articles comprising a reflective polymeric film and a retroreflective layer, the reflective film comprising alternating layers of at least a first and second polymer, the alternating layers being configured to exhibit a relatively high reflectance for normally incident light within a first spectral range and a relatively low reflectance for normally incident light within a second spectral range. The reflective film is disposed at the front side of the article while the retroreflective layer is disposed at the rear side. In some embodiments at least two of the alternating layers have indices of refraction along an axis perpendicular to a plane of the film which differ by no more than 50% of the maximum in-plane refractive index difference between such layers, and more preferably no more than about 20%. Such a construction helps to preserve the shape of spectral transitions over a wide range of entrance (tilt) angles. In some embodiments the polymeric layers define optical repeating units which are arranged in a sequence to have a specific thickness profile designed to give sharpened spectral transitions.

The reflective film can have different spectral characteristics depending upon the performance desired in the end article. In some applications it is desirable that the first and second spectral range are discontinuous and intermeshed to define a series of spectral bands which convey a security code analogous to a bar code. In others it is desired that the second spectral range substantially cover the visible spectrum so that the retroreflective performance is not degraded in the visible. In those cases the first spectral range is located in the infrared or ultraviolet to inhibit retroreflection in favor of specular reflection at those wavelengths. In still other applications it may be desirable to configure the reflective film as a polarizer rather than a mirror.

The retroreflective layer preferably exhibits retroreflectance in all planes of incidence, but alternately can do so in at least one plane of incidence but not in at least one other plane of incidence.

Figure 1:
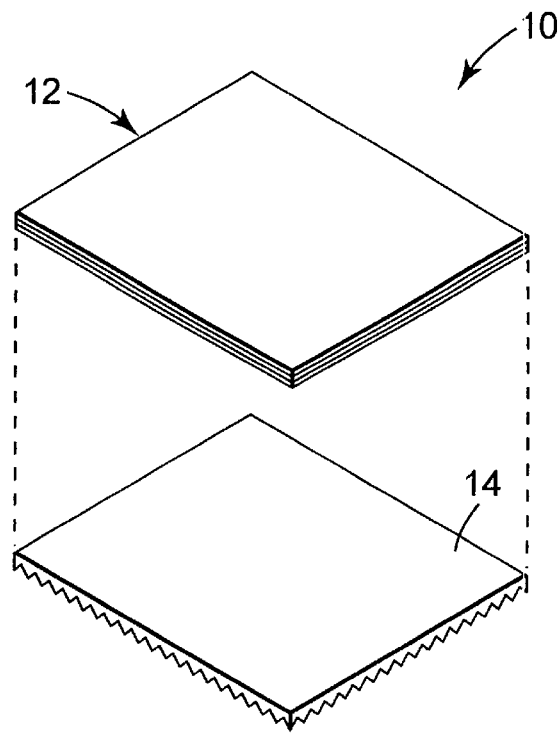
FIG. 1 is an exploded view of principal components of a retroreflective dichroic reflector.

In the drawings, the same reference symbol is used for convenience to indicate elements which are the same or which perform the same or a similar function.

DETAILED DESCRIPTION OF THE ILLUSTRATIVE EMBODIMENTS

The combination reflective/retroreflective articles described herein are ordinarily configured as sheetings which can be applied to a given object or substrate and which incorporate various combinations of dichroic reflective films and retroreflective layers. The articles are generally single-sided optically. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer. The particular type of dichroic film and retroreflective layer employed make the article more suitable for certain end-use applications than for others. Only some end uses are discussed below. The text that follows begins with a discussion of the overall article configuration, followed by an in-depth discussion of preferred polymeric multilayer films, example articles, and ends with a glossary.

Illustrative Article Configurations

FIG. 1 is an exploded view of an article 10 which includes a multilayer polymeric film 12 covering a retroreflective layer 14. Film 12 comprises a multilayer polymeric film having a percent reflectance and transmission which are substantially complementary (i.e., absorption is preferably low or negligible) for wavelengths of interest, and which are functions of the refractive indices and thicknesses of the constituent polymeric layers, as well as of the orientation and polarization of incident light. Preferred layers 12 are discussed in more detail below, and are to be distinguished from conventional non-polymeric interference filters comprising inorganic alternating dielectric layers deposited on a substrate using vacuum deposition techniques. Such inorganic filters are expensive and often of limited surface area. They also tend to have poor adhesion to polymeric surfaces. Further, such inorganic filters are generally not capable of maintaining a sharp spectral transition over a wide range of entrance angles, as explained below.

It should be noted that the multilayer film 12 exhibits a spectral shift in percent reflectance and transmission as a function of entrance angle of incident light, and that the percent reflectance and transmission are functions of polarization for obliquely incident light. "S-" and "p-" polarization states refer to light having an electric field vector normal to and disposed in, respectively, the entrance plane. Unpolarized light is half p-polarized and half s-polarized. Preferred multilayer films retain sharp spectral transition features for p-polarized light over the wide range of entrance angles supported by the retroreflective sheeting.

Retroreflective layer 14 can comprise conventional cube corner or beaded retroreflective sheeting, for which detection of retroreflected light is best at small observation angles, i.e. for a detector positioned close to the light source. Such sheeting supports retroreflection over a wide range of entrance angles and orientation angles, so that the angular orientation of article 10 with respect to an interrogating light source is not critical.

Figure 2:
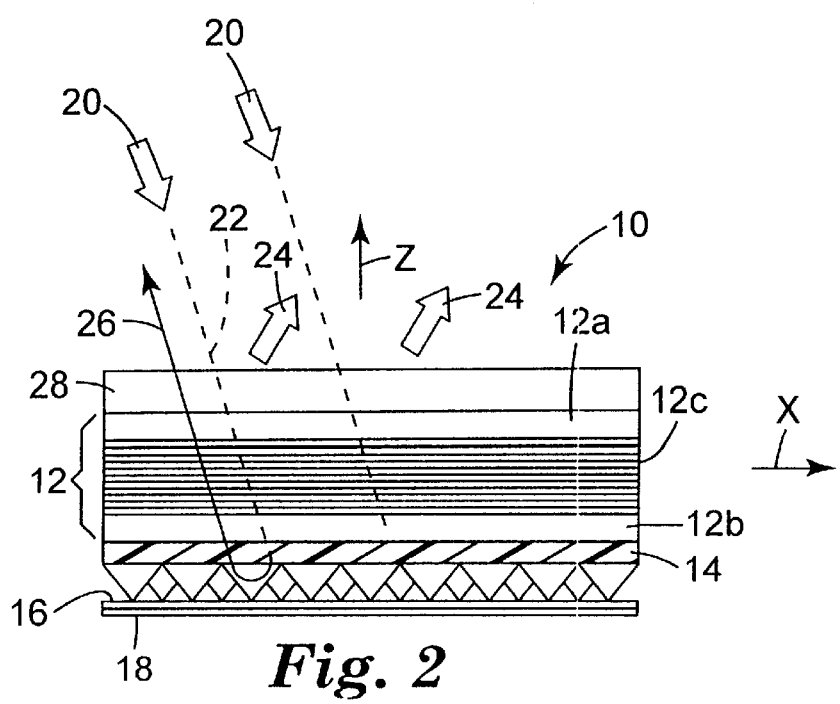
FIG. 2 is a side sectional view of a retroreflective dichroic reflector.

FIG. 2 shows a sectional view of the article 10, more fully than in FIG. 1. Reflective layer 12 has a front and rear skin layer 12a, 12b, respectively, which serve to protect the central multilayer film 12c somewhat and which provide mechanical support for film 12c. A conventional seal film 16 is provided at the back side of the retroreflective layer 14 to protect the retroreflective elements from degradation caused by moisture, dirt, oils, and the like, and a conventional adhesive layer 18 is applied to the backside therof to permit the article 10 to be applied to a desired object. A release liner (not shown) can also be included to protect the adhesive layer until the article is ready to be applied to a substrate. Seal film 16 can be sealed against layer 14 in a conventional polygonal pattern using a hot press technique which destroys cube corner elements along the periphery of such polygons. The faces of the structured rear surface of layer 14 can contact air and operate on the principles of total internal reflection (TIR) or, if desired, a vapor coat of specularly reflective material such as aluminum can be applied to such faces.

Cartesian coordinates X,Z are shown in FIG. 2; a Y-axis (not shown) perpendicular to the X- and Z-axes points into the page. The X-Y plane defines the plane of the article 10 and the Z-axis is normal to the article. As shown, broadband light 20 is incident along an illumination axis 22 at a small but non-zero entrance angle with respect to the Z-axis. The entrance angle is small enough that the behavior of s- and p-polarized light is not significantly different. Multilayer film 12c reflects the portion of light 20 in a first spectral range into specularly reflected light components 24. Specularly reflected light 24 is directed along a reflection axis that makes the same angle with the Z-axis as does axis 22. The portion of light 20 in a second spectral range is transmitted by film 12c, and then retroreflected by layer 14, as indicated by the retroreflected light component 26. Article 10 thus exhibits both retroreflective and specularly reflective qualities. Where the article 10 is applied to clothing it may exhibit a shiny mirror-like finish in daylight but appear retroreflective to vehicle drivers at night. A top layer 28 can be added to enhance durability of the product. Layer 28 can also include a dye therein to give a colored appearance to the article.

Figure 3A:
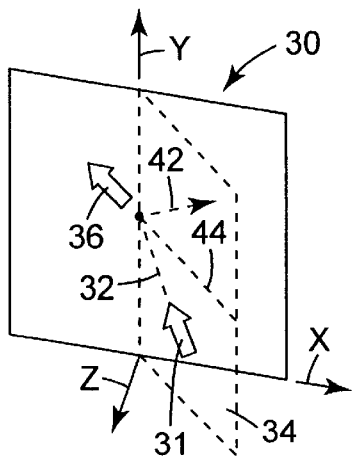
FIG. 3A is a perspective front view of a retroreflective dichroic reflector which exhibits retroreflectance in some planes of incidence and not others.
Figure 3B:
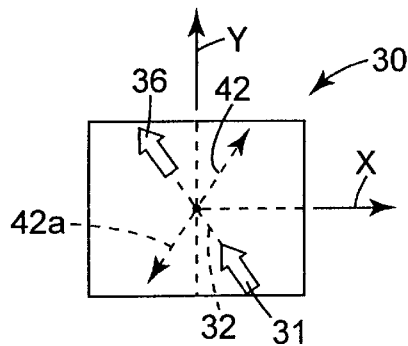
FIG. 3B is a front plan view thereof.

Turning now to FIGS. 3A and 3B, an article 30 similar to article 10, but having distinctive properties due to the use of a different retroreflective layer, is shown schematically in the context of a Cartesian XYZ coordinate system having the X- and Y-axes in the plane of the article and the Z-axis normal to the article. The X- and Y-axes are aligned such that the X-Z plane and the Y-Z plane are planes of symmetry for the rear structured surface of the retroreflective layer. The different retroreflective layer makes viewing retroreflected light more complicated because the observation angle at which such light is visible changes as a function of both entrance angle and orientation angle of the incident light.

Incident light 31 is directed along an illumination axis 32 which defines an entrance angle (the angle between axis 32 and the Z-axis) and an orientation angle (the angle between the Y-axis and the projection of axis 32 in the X-Y plane). A plane 34, not to be confused with the entrance half-plane (not shown), contains axis 32 and the Y-axis. The multilayer film 12 reflects a first spectral range of incident light 31 into a specularly reflected light component 36. The directions of incident light 31 and specularly reflected light 36 make equal angles with the surface normal, i.e., with the Z-axis. Certain spectral components of the incident light 31 are transmitted by multilayer film 12 and reflected by a rear retroreflecting layer (38 in FIG. 3C; 40 in FIG. 3D) and transmitted back through multilayer film 12 as a second reflected light beam 42. Unlike the embodiment of FIG. 2—which utilizes fully retroreflective cube corner elements—the reflected light 42 in FIGS. 3A–B is not necessarily retroreflected in a direction antiparallel to incident light 31. Instead, reflected light 42 can be angularly displaced from the incident light direction depending upon the orientation (entrance angle and orientation angle) of the incident light direction with respect to the article 30. This property can give rise to a flashing visual effect if there is relative motion between the light source, the article, and the observer. Referring to FIG. 3A, the direction of reflected light 42 and incident light 31 make equal angles with respect to a line segment 44. Line segment 44 is defined by the intersection of a retroreflecting plane associated with the retroreflecting layer (in this instance, a plane parallel to the X-Z plane) with the plane 34.

Retroreflecting layer 38 has only one associated retroreflecting plane—the X-Z plane—while the layer 40 has two retroreflecting planes—the X-Z plane and the Y-Z plane. In this context, the "X-Z" plane and the "Y-Z" plane include the family of all planes parallel thereto which intersect the article. The layer 38 comprises a structured surface having a linear array of miniature substantially right-angled isosceles prisms arranged side-by-side and extending parallel to the Y-axis, substantially as described in U.S. Pat. No. 4,906,070 (Cobb, Jr.). Light which is obliquely incident upon the smooth front surface of the film opposite the structured surface is retroreflected by the film if the direction of incidence lies in a plane (the X-Z plane) perpendicular to the length of the prisms. The layer 40 comprises a structured surface having an array of pyramid-like structures 41 extending out of the layer 40, each structure 41 having a first set of mutually perpendicular reflective facets 41a,41b which define the X-Z plane of retroreflection and a second set of mutually perpendicular reflective facets 41c,41d which define the Y-Z plane of retroreflection, substantially as described in U.S. Pat. Ser. No. 08/883,870 entitled "Dual Axis Retroreflective Article". It should be noted that layer 40 can in general produce a second patterned reflected light component 42a (see FIG. 3B) due to reflection from facets 41c,41d in addition to reflected light component 42, which arises due to reflection from facets 41a,41b. The structured surface of layer 40 can also include standard cube corner elements such that the article exhibits both dual axis retroreflection and full (three axis) retroreflection.

The cube corner elements, prisms, and pyramids on the structured surface of retroreflective layers 14, 38, and 40 respectively are preferably miniature structures formed using known microreplication techniques. The reflective/retroreflective articles discussed above are preferably thin and flexible to permit application to a variety of object or surface shapes, although rigid or otherwise thick constructions may be desirable for some applications. The individual structures in the structured surface preferably have a vertical and lateral extent of no more than about 1 mm, and more preferably in the range of about 0.075 to 0.2 mm, although the linear prisms can extend along the entire length of the article which may be on the order of millimeters, centimeters, or meters. The retroreflective layers can be made from any suitable transparent materials, preferably polymers and preferably materials that are dimensionally stable, durable, weatherable, and easily replicated in the desired configuration. Examples include acrylics, polycarbonates, polyethylene-based ionomers, and cellulose acetate butyrates. Dyes, coloring agents, and pigments can also be incorporated into such layers.

Figure 4:
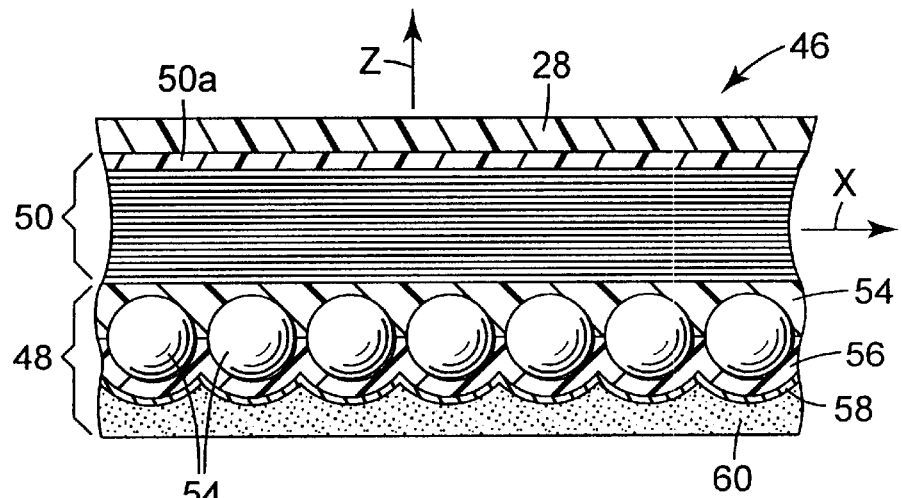
FIG. 4 is a side sectional view of a retroreflective dichroic reflector which incorporates beaded retroreflective sheeting for the retroreflective layer.

The reflective/retroreflective article 46 of FIG. 4 uses a beaded retroreflective sheeting layer 48 similar to that described in U.S. Pat. 4,708,920 (Orensteen et al.) together with a multilayer film 50. Film 50 has the same reflectance and transmission properties as multilayer film 12 discussed above. Film 50 has a protective skin layer 50a on the front surface thereof. Protective layer 28 is also provided. Retroreflective layer 48 has a multitude of transparent microspheres 54 held between a transparent overcoat layer 54 and a transparent spacer layer 56. Light impinging from a given direction on the overcoat layer is focused by the microspheres onto small areas of a reflective masking layer 58, which is typically a specularly reflective metallic coating such as aluminum, and reflected back through the microspheres in the opposite direction. An adhesive layer 60 abuts masking layer 58.

Figure 5:
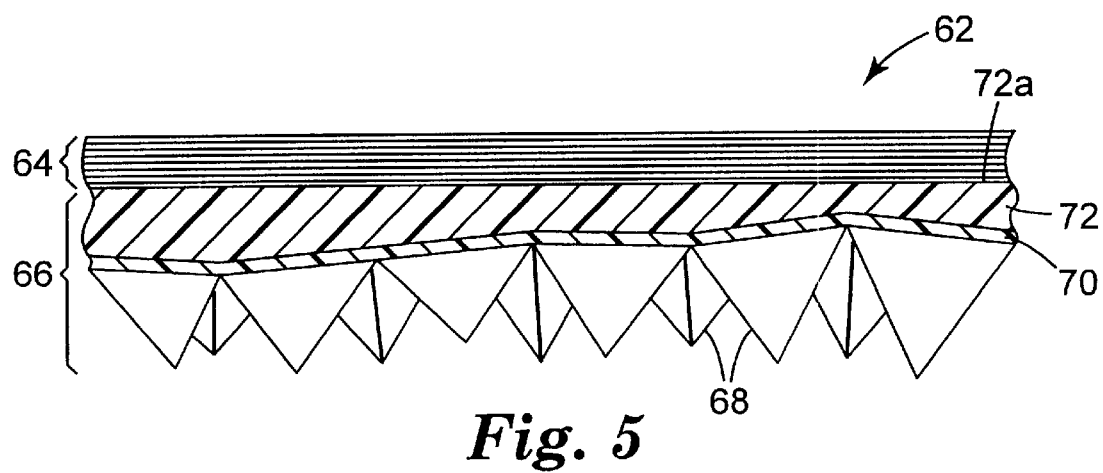
FIG. 5 is a side sectional view of a portion of an article incorporating cube corner retroreflective sheeting having cube corner elements arranged to impart a glittering quality to the sheeting.

FIG. 5 shows an embodiment 62 where a multilayer film 64, having reflective and transmissive properties similar to previously described films 12 and 50, is laminated to a retroreflective layer 66. Layer 66 is described in detail in U.S. patent application Ser. No. 08/640,326 entitled "Glittering Cube-Corner Retroreflective Sheeting" (Attorney Docket No. 52373USA3A), filed Apr. 30, 1996 and assigned to the same assignee as the present application. Basically, retroreflective layer 66 comprises zones where cube corner elements 68 are randomly tilted across the cube corner array. The random tilting of cube corner elements imparts a glittering quality to layer 66. Layer 66 is seen to comprise a cube corner layer, which includes cube corners 68 and an optional land layer 70, and a body layer 72 having a substantially flat front surface 72a and a rear surface which is not uniformly spaced from the front surface.

Multilayer Polymeric Film Design

Figure 6:
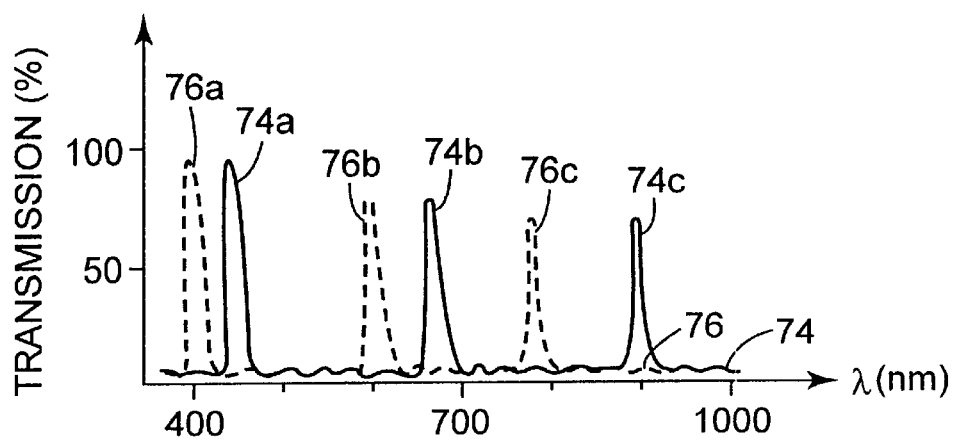
FIG. 6 is an idealized percent transmission spectrum of a multilayer polymeric film useable in some embodiments.

FIG. 6 shows a possible idealized percent transmission spectrum for multilayer films 12, 50, and 64. A solid-line curve 74 represents behavior for light incident normally on the film (and, where the film is a dichroic polarizer, the light is polarized and properly aligned with the film axis) and broken-line curve 76 represents behavior for only p-polarized light incident at a nonzero entrance angle such as 30 to 40 degrees. The transmission spectrum for s-polarized light at the nonzero entrance angle is not shown to avoid confusion. Entrance angle is referenced to an air medium. Over the wavelength range of interest the absorption of the component layers of the film is small enough so that from a practical standpoint reflectance≈100%—transmission over such wavelength range.

The multilayer film is configured to exhibit at least one narrow transmission band 74a, 74b, 74c. Bands 74a,74b,74c are regions of relatively low reflectance and the wavelengths between the bands are regions of relatively high reflectance. Although bands 74a,74b,74c are shown with transmission maxima greater than 50%, films with lower maxima may also be useable depending upon the application, and will exhibit less "color" in the reflectivity spectrum, which is beneficial if a high gloss mirror-type ambient appearance is desired. "Fractional bandwidth" is a term used to describe the width of a reflection or transmission band, and is measured as the full spectral width (in units of distance such as nm) at half of the maximum transmission of the band divided by the center wavelength of the band (which bifurcates the full spectral width). For some applications, fractional bandwidths on the order of 10 to 15% or less are desirable. Polymeric film constructions having thickness gradients effective to produce sharper cut-on and cut-off transitions to permit narrower spectral features than previously attainable in polymeric films are described below.

The film associated with the spectra of FIG. 6 has, at normal incidence, two transmission bands in the visible and one in the near infrared. Alternative films useable in a combined reflective/retroreflective article as disclosed herein can have a different number and placement of transmission bands. A film with a transmission band in the visible for at least some entrance angles enables visual detection of the retroreflected beam by the unaided human eye. A film having a single band at slightly greater than 400 nm at normal incidence produces a vivid blue retroreflected beam for head-on viewing and then, as the article is tilted and the band blue-shifts into the ultraviolet region, the article appears like an ordinary mirror since the retroreflected ultraviolet light is not detectable by the eye. A film having a single band towards the red end of the visible spectrum at normal incidence produces a vivid red retroreflected beam for head-on viewing and as the article is tilted the retroreflected beam shifts to the yellow and green portion of the spectrum. A film having a single band at slightly greater than 700 nm (up to about 800 nm) at normal incidence appears like an ordinary mirror for head-on viewing but retroreflects light in vivid shades of red at higher angles of incidence. Finally, a film having a single band located well into the near infrared (or, even slightly disposed in the ultraviolet) at zero entrance angle will appear like an ordinary mirror at all viewing angles. A detector which is sensitive to infrared or ultraviolet light as appropriate can of course be used to detect retroreflected light outside of the visible spectrum.

It is desirable in some applications that the multilayer film have a transmission band that does not significantly increase in fractional bandwidth nor decrease in amplitude as the entrance angle increases beyond zero degrees, for the portion of the incident light that is p-polarized. In FIG. 6 it can be seen that p-polarized transmission bands 76a,76b,76c are blue-shifted compared with the corresponding bands 74a–c respectively of curve 74 for normally incident light, and significantly the peak amplitudes and fractional bandwidths are substantially unchanged. Such preservation of peak amplitude and fractional bandwidth are due to a preservation of the shape of the two transitions on either side of the band peak making up the band, which in turn comes about when the multilayer film is composed of individual layers whose out-of-plane (i.e., Z-axis) indices of refraction are substantially matched. This construction can be realized where at least some of the layers are composed of a polymer whose in-plane refractive indices are functions of known post-extrusion stretching procedures. Previously available multilayer films, such as those made by vacuum deposition of isotropic inorganic layers, have the same index mismatch in the out-of-plane direction as the in-plane directions, and as a result they experience a detrimental decrease in peak amplitude and increase in fractional bandwidth for a given p-polarization transmission band as entrance angle is increased. Furthermore, baseline or "out-of-band" p-polarization transmission levels for such nonideal films degrades (increases) substantially with increasing entrance angle, typically exceeding leakage levels of 30% for p-polarized light.

The reflectance and transmission spectra of a particular multilayer film primarily depends on the optical thickness of the individual layers along the various axes, and is substantially determined by the well known Fresnel coefficients. Films can be designed to reflect infrared, visible, or ultraviolet light by choice of the appropriate optical thicknesses of the layers in accordance with the following formula:

$$\lambda_M = (2/M) \bullet D_r \qquad (I)$$

where M is an integer representing the particular order of the reflected light and $D_r$ is the optical thickness of an optical repeating unit ("ORU"). Accordingly, $D_r$ is the sum of the optical thicknesses of the individual layers that make up the ORU. By arranging the ORUs along the thickness of the multilayer film in a series such that the optical thicknesses of the ORUs conform to a give profile, a multilayer film can be designed that reflects light over a broad reflection band.

A reflecting multilayer film having the properties described herein can be made by employing a multilayer coextrusion device as described in U.S. Pat. Nos. 3,773,882 (Schrenk) and 3,884,606 (Schrenk). Such a device provides a method for preparing multilayered, simultaneously extruded thermoplastic materials, each layer of which has a substantially uniform layer thickness. The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream can be subsequently passed through a series of layer multiplying means, such as described in U.S. Pat. Nos. 3,759,647 (Schrenk et al.), 5,094,788 (Schrenk et al.), or 5,094,793 (Schrenk et al.), in order to further increase the number of layers in the final film. The multilayered stream is then passed into an extrusion die which is so constructed and arranged (see, e.g., U.S. Pat. No. 3,557,265 (Chisholm et al.)) that streamlined flow is maintained therein. The resultant product is extruded to form a multilayered film in which each layer is generally parallel to the major surface of adjacent layers. The configuration of the extrusion die can vary and can be such as to reduce the thickness and dimensions of each of the layers. The number of layers in the reflective film body can be selected to achieve the desired optical properties using the minumum number of layers for reasons of film thickness, flexibility, and economy. In the case of mirrors and reflective polarizers, the number of layers is preferably less than about 10,000, more preferably less than about 5,000, and (even more preferably) less than about 2,000.

The desired relationship between refractive indices of polymeric layers can be achieved by selection of appropriate materials and appropriate processing conditions. In the case of organic polymers which can be oriented by stretching, the multilayer films are generally prepared by coextruding the individual polymers to form a multilayer film (as set forth above) and then "orienting" the reflective film body by stretching at a selected temperature, optionally followed by heat-setting at a selected temperature. Alternatively, the extrusion and orientation steps can be performed simultaneously. By the orientation, the desired extent of birefringence (positive or negative) is set in those polymeric layers that comprise a polymer that can exhibit birefringence. In the case of mirrors, the film can be stretched substantially in two directions (biaxial orientation) to produce a mirror film where any given individual layer has substantially the same in-plane refractive indices and at least some of such layers have an out-of-plane refractive index different from the in-plane indices (and therefore are birefringent). In the case of polarizers, the film can be stretched predominantly along a major stretch axis to produce a polarizer film where at least some layers have different in-plane refractive indices and some layers have an out-of-plane index different from at least one in-plane index. The film body can be allowed to dimensionally relax in the cross-stretch direction from the natural reduction in cross-stretch (equal to the square root of the stretch ratio) to being constrained (i.e., no substantial change in cross-stretch dimensions). The film body can be stretched in the machine direction, as with a length orienter, and/or in width using a tenter. The pre-stretch temperature, stretch rate, stretch ratio, heat set temperature, heat set time, heat set relaxation, and cross-stretch relaxation are selected to yield a multilayer film having the desired refractive index relationship. These variables are interdependent: thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratio in the range from about 1:2 to about 1:10 more preferably about 1:3 to about 1:7) in the stretch direction and from about 1:0.2 to about 1:10 (more preferably from about 1:0.2 to about 1:7) orthogonal to the stretch direction is preferred.

Orientation of the extruded film can be done by stretching individual sheets of the material in heated air. For economical production, stretching can be accomplished on a continuous basis in a standard length orienter, tenter oven, or both. Economies of scale and line speeds of standard polymer film production can be achieved thereby achieving manufacturing costs that are substantially lower than costs associated with commercially available absorptive polarizers. Lamination of two or more multi-layer films can also be practiced to obtain a mirror film. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the multi-layer films, optical clarity and exclusion of air being the primary guiding principles. It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the desired performance.

One class of polymeric materials incorporated into the multilayer film preferably produce birefringent polymeric layers. These materials are characterized in that stretching in a given direction substantially alters one or more of its refractive indices, and a particularly preferred layer is one containing a crystalline or semi-crystalline polyethylene naphthalate (PEN) inclusive the isomers (e.g. 2,6-; 1,4-; 1,5-; 2,7; and 2,3-PEN). Another class of polymeric materials incorporated into the multilayer film preferably produce substantially isotropic polymeric layers. These materials are characterized in that stretching in a given direction has little or no effect on its refractive indices, and a particularly preferred layer is one containing a layer containing a polymethylmethacrylate and in particular polymethylmethacrylate itself.

Materials Selection For Multilayer Film

A variety of polymer materials suitable for use in the embodiments herein have been taught for use in making coextruded multilayer optical films. For example, in U.S. Pat. Nos. 4,937,134, 5,103,337, 5,1225,448,404, 5,540,978, and 5,568,316 to Schrenk et al., and in 5,122,905, 5,122,906, and 5,126,880 to Wheatley and Schrenk. Of special interest are birefringent polymers such as those described in 5,486,949 and 5,612,820 to Schrenk et al, U.S. application Ser. No. 08/402,041 to Jonza et al, and U.S. Application entitled "Modified Copolyesters and Improved Multilayer Reflective Films" filed on even date by applicants under Attorney Docket No. 53550USA6A, all of which are herein incorporated by reference. Regarding the preferred materials from which the films are to be made, there are several conditions which should be met to make the preferred multilayer optical films. First, these films should consist of at least two distinguishable polymers; the number is not limited, and three or more polymers may be advantageously used in particular films. Second, at least one of the two polymers, referred to as the "first polymer", should have a stress optical coefficient having a large absolute value. In other words, it should be capable of developing a large birefringence when stretched. Depending on the application, the birefringence may be developed between two orthogonal directions in the plane of the film, between one or more in-plane directions and the direction perpendicular to the film plane, or a combination of these. Third, the first polymer should be capable of maintaining birefringence after stretching, so that the desired optical properties are imparted to the finished film. Fourth, the other required polymer, referred to as the "second polymer", should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may be chosen so that, after processing, its refractive index will match that of the first polymer in either the stretching direction or the planar direction orthogonal to stretching. Further, the second polymer will be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative-positive or positive-negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and levels of orientation for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films described herein. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions impose an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes; polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyetheramides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (includine polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly (aryl styrene)s, poly(styrene halide)s, poly(alkoxy styrene)s, poly(vinyl ester benzoate), poly(vinyl naphthalene), poly (vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly (butyl styrene). Examples of poly(aryl styrene)s include the isomers of poly(phenyl styrene). As for the poly(styrene halide)s, examples include the isomers of the following: poly(chlorostyrene), poly(bromostyrene), and poly (fluorostyrene). Examples of poly(alkoxy styrene)s include the isomers of the following: poly(methoxy styrene) and poly(ethoxy styrene). Among these examples, particularly preferable styrene group polymers, are: polystyrene, poly (p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers may be block copolymers, random copolymers, or alternating copolymers.

The syndiotactic vinyl aromatic polymers and copolymers referred to herein generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/ coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For mirror films, a match of the refractive indices of the first polymer and second polymer in the direction normal to the film plane is preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The important property is that the normal-to-plane index for one material be closer to the in-plane indices of the other material than to its own in-plane indices.

It is sometimes preferred for the multilayer optical films to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Preferred multicomponent constructions are described in the copending application entitled "Multicomponent Optical Body" filed on even date under attorney docket 53543USA1A.

Returning now to our general discussion of the multilayer film, it has been found that substantial differences between the Z-index of adjacent layers can be tolerated and still maintain adequate optical performance of the multilayer film over a wide range of entrance angles. Basically, the more closely the Z-indices are matched, the greater the range of entrance angles over which the amplitude and fractional bandwidth of a given transmission band stay within specified limits. It is preferred that the Z-index mismatch of adjacent layers be no more than half, and more preferably no more than about 20%, of the maximum in-plane mismatch between such layers. The in-plane mismatch is typically on the order of at least 0.05 in refractive index.

Turning again to FIG. 6, it has been noted that the transmission spectrum of s-polarized light at the nonzero entrance angle is not depicted. For completeness a verbal description follows. As the entrance angle increases from zero degrees, the cut-on and cut-off transitions making up a given transmission band are blue-shifted by different amounts such that they overlap in a way that progressively diminishes the amplitude of the band. To first order, the center wavelength of the diminished s-polarization band approximately tracks the center wavelength of the p-polarization band. At out-of-band wavelengths, the s-polarization transmission progressively decreases (reflectance increases) with increasing entrance angle relative to its initially low level. It should be noted that the s-polarization transmission spectrum changes in the same way with entrance angle whether the multilayer film has the preferred z-index matched polymeric construction or the nonpreferred isotropic layer construction. This, of course, is because s-polarized light has no E-field component in the Z-direction.

At high entrance angles, light transmitted through transmission band(s) which are relatively narrow will be predominantly p-polarized due to the disappearing s-polarization transmission band(s). However, multiple reflections occuring in the retroreflective layer will generally produce a retroreflected beam whose polarization is "scrambled" relative to the predominantly p-polarized beam transmitted through the multilayer film. Even though the wavelength of the retroreflected light is inherently matched with the narrow transmission band(s) of the multilayer film, only a portion (chiefly the p-polarization component) of the initially retroreflected light will be transmitted back through the multilayer film. Advantageously, a substantial portion of the retroreflected light not initially transmitted by the film ultimately is transmitted after one or more reflection/retroreflection cycles due to the high reflectivity (low absorption) of the multilayer film, the high efficiency of the retroreflector elements, and the polarization-scrambling properties of the retroreflector elements. The brightness of the retroreflected beam can thus be enhanced by this recycling of light between the low loss multilayer film and retroreflecting layer.

The multilayer film in any of the disclosed embodiments is preferably spatially uniform across the face of the article. However, the film can alternatively incorporate neighboring regions specifically tailored to exhibit differing optical properties. For example, one or more regions of an initially uniform multilayer film can be embossed using heat and pressure. The embossed regions are thinner than non-embossed neighboring regions and therefore have spectral transmission and reflection features which are blue-shifted relative to corresponding features of the non-embossed regions. The embossed regions can take the form of an information conveying pattern. The combination of embossed and non-embossed regions can be used to achieve two or more retroreflected colors.

Transition-Preserving Color Shifting Film Example: Green Narrowband

A coextruded film containing 417 layers was made on a sequential flat-film making line via a coextrusion process. This multilayer polymer film was made from polyethylene naphthalate ("PEN") and a thermoplastic elastomer known as Ecdel 9967 available from Eastman Chemical Co. A feedblock method similar to that of U.S. Pat. No. 3,801,429 (Schrenk et al.) was used to generate an intermediate meltstream having about 209 layers with a layer thickness profile sufficient to produce an optical reflection band with a fractional bandwidth of about 30%.

Polyethylene naphthalate (PEN: 60 wt. % phenol/40 wt. % dichlorobenzene) with an Intrinsic Viscosity (IV) of 0.48 dl/g was delivered to the feedblock by one extruder at a rate of 19.2 kg/hr and the Ecdel elastomer was delivered by another extruder at a rate of 40.7 kg/hr. These initial meltstreams were directed to the feedblock which distributed them to produce an intermediate meltstream having 209 alternating layers of PEN and Ecdel, including two outside layers of PEN serving as protective boundary layers (PBLs) through the feedblock. The 209 layers have an approximate layer thickness profile created by the feedblock dimensions and the film extrusion rates. After the feedblock, the same PEN extruder delivered additional PEN to the outside layers of the intermediate meltstream (also referred to as the "extrudate") at about 13.5 kg/hr total flow to serve as PBLs for the multiplier stage which immediately followed.

An asymmetric two times multiplier then split the extrudate into two meltstreams of unequal width, the widths being related by a "multiplier ratio". The two meltstreams were widened to a common dimension, and their thicknesses diminished accordingly before the two meltstreams were combined one on top of the other. The combined meltstream thus consisted of two meltstreams having the same number (209) and composition of constituent layers, but where the thickness of the constituent layers in one meltstream differed from those in the other meltstream by the multiplier ratio. This construction yielded a finished film which had two similar spectral features, one blue-shifted relative to the other due to the thickness difference. Slight differences in layer thickness are introduced into the extrudate by the multiplier, and account for differences in such spectral features.

After the multiplier, symmetric PBLs as outside skin layers were added at about 12.5 Kg/hour (total) that was fed from a third extruder. The resulting meltstream passed through a film die and onto a water-cooled casting wheel. The casting wheel speed was adjusted for precise control of final film thickness, and therefore, final color. The inlet water temperature on the casting wheel was about 7 degrees Celsius. The Ecdel melt process equipment was maintained at about 249 degrees C.; the PEN melt process equipment and the feedblock were maintained at about 285 degrees C. The skin-layer modules, multiplier and die were maintained at about 290 degrees C.

A high voltage pinning system was used to pin the meltstream extrudate to the casting wheel as it exited the die. The pinning wire was about 0.17 mm thick and a voltage of about 5.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of 3.5 at about 135 degrees C. The film was preheated in a 138 degree C. tenter preheat zone for about 25 seconds and drawn at 140 degree C. in the transverse direction to a draw ratio of about 5.0 at a rate of about 16% per second. The finished film had a final thickness of about 0.05 mm.

Figure 7:
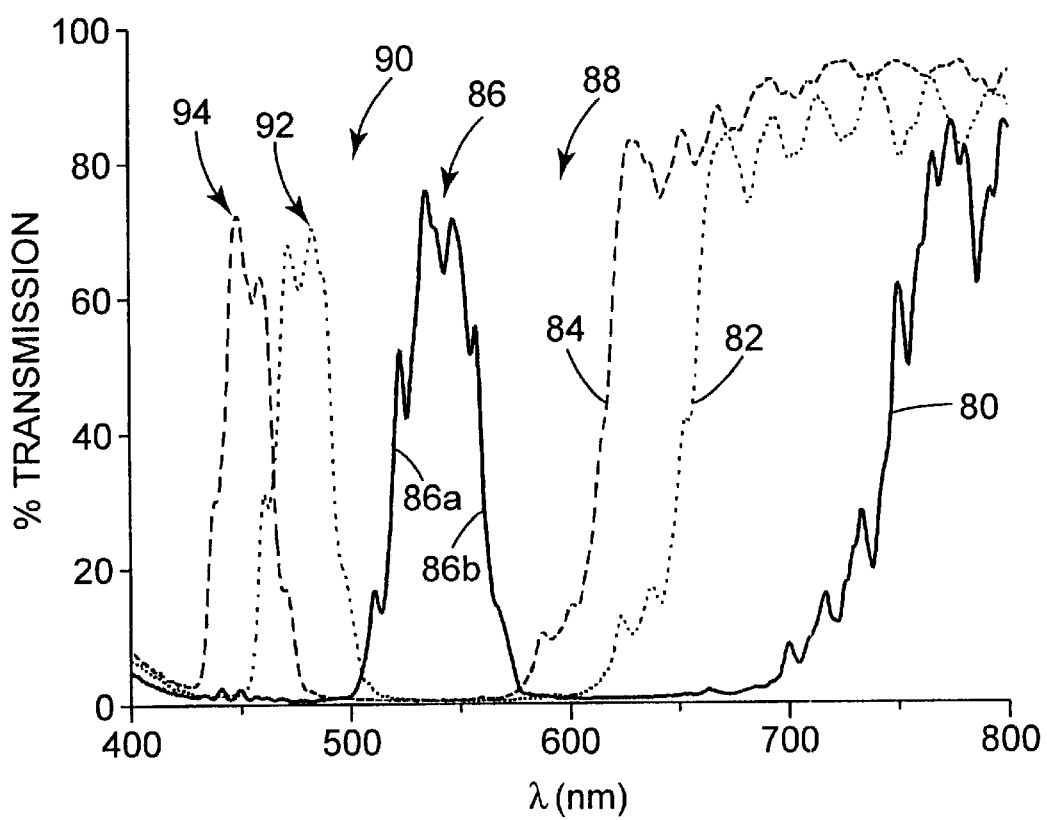
FIG. 7 is a measured percent transmission spectrum of a multilayer polymeric film example useable in some embodiments.

Visually the film had a highly reflective, shiny appearance in ambient room light when viewed against a dark background. White light sources appeared vivid green when viewed through the film by itself, for light passing orthogonally through the film. Increasing the incident light entrance angle by tilting the film produced a progression of colors from green to magenta and then to orange. FIG. 7 shows the percent transmission measured for normally incident light (curve 80) and for p-polarized light at 45 and 60 degree entrance angles (curves 82,84). Percent reflectance is 100% minus percent transmission over the wavelengths shown to within about 1%. Curve 80 has a narrow transmission band 86 having a cut-on transition 86a and a cut-off transition 86b disposed between two broad reflection bands 88,90 which are spectrally separated. Reflection band 88 is seen to have a fractional bandwidth of about 30% (~200 nm ÷~650 nm). Band 90 has the same fractional bandwidth but is blue-shifted due to the asymmetric multiplier operation discussed above. Transmission band 86 has a relatively small fractional bandwidth of about 10% (~50 nm ÷~525 nm). The maximum percent transmission for band 86 is seen to be fairly high, at slightly over 70%. Thus, maximum transmission for two passes through the film (ignoring light recycling) will be about 50%. The film is also seen to have greater than 90% reflectance over about 75% of the visible spectrum. The shape of p-polarized transmission band 92 in curve 82, and of band 94 in curve 84, compares favorably with band 86: these bands have a maximum percent transmission of about 70% and a fractional bandwidth of about 10% or less.

Spectral "Bar Code" Films For Security Applications

Counterfeiting and forgery of documents and components, and the illegal diversion of controlled materials such as explosives, is a serious and pervasive problem. For example, commercial aircraft maintenance crews regularly encounter suspected counterfeit parts, but lack a reliable means to distinguish between high-grade parts and counterfeit parts that are marked as meeting specifications. Similarly, it is reported that up to ten percent of all laser printer cartridges that are sold as new are actually refurbished cartridges that have been repackaged and represented as new. Identification and tracking of bulk items such as ammonium nitrate fertilizer usable in explosives is also highly desirable, but current means of identification are prohibitively expensive.

Several means exist to verify the authenticity of an item, the integrity of packaging, or to trace the origin of parts, components, and raw materials. Some of these devices are ambient verifiable, some are verifiable with separate lights, instruments, etc., and some combine aspects of both. Examples of devices used for the verification of documents and package integrity include iridescent inks and pigments, special fibers and watermarks, magnetic inks and coatings, fine printings, holograms, and Confirm® imaged retroreflective sheeting available from 3M. Fewer options are available for authentication of components, mostly due to size, cost, and durability constraints. Proposed systems include magnetic films and integrated circuit chips.

Microtaggants have been used to trace controlled materials such as explosives. These materials are typically multilayer polymers that are ground up and dispersed into the product. The individual layers in the microtaggant can be decoded using an optical microscope to yield information pertaining to the date and location of manufacture. There has been a long unmet need for a security film product that is both ambient verifiable and machine readable, that is manufacturable but not easily duplicated, that is flexible and can be used on a variety of part sizes ranging from near microscopic to large sheets, and that may be coded with specific, machine-readable information.

The color selective films and optical bodies of the present invention can be tailored to provide a security film or device useful as a backing, label, or overlaminate that meets all of these needs. The color shifting feature and high reflectivity and color saturation at off-angles are properties that can be exploited to uniquely identify a document or package, and spectral detail can be designed into the films to provide unique spectral fingerprints that may be used to identify specific lots of security film to code individual applications. The security films and optical bodies can be tailored to reflect over any desired portion of the spectrum, including visible, infrared, or ultraviolet. When only covert identification is desired, a film can be made that appears transparent in the visible region of the spectrum but that has varying transmission and reflection bands in the infrared region to impart a covert spectral fingerprint.

The films exhibiting a bar code-type spectrum as described herein can be considered to have a discontinuous first spectral range, having a relatively low reflectance, intermeshed with a discontinuous second spectral range, having a relatively high reflectance. The first spectral range comprises a sequence of transmission bands and the second spectral range comprises a sequence of reflectance bands. The transmission and reflectance bands can have the same bandwidths, for simplicity of bar code design, or different bandwidths as desired.

Figure 8A:
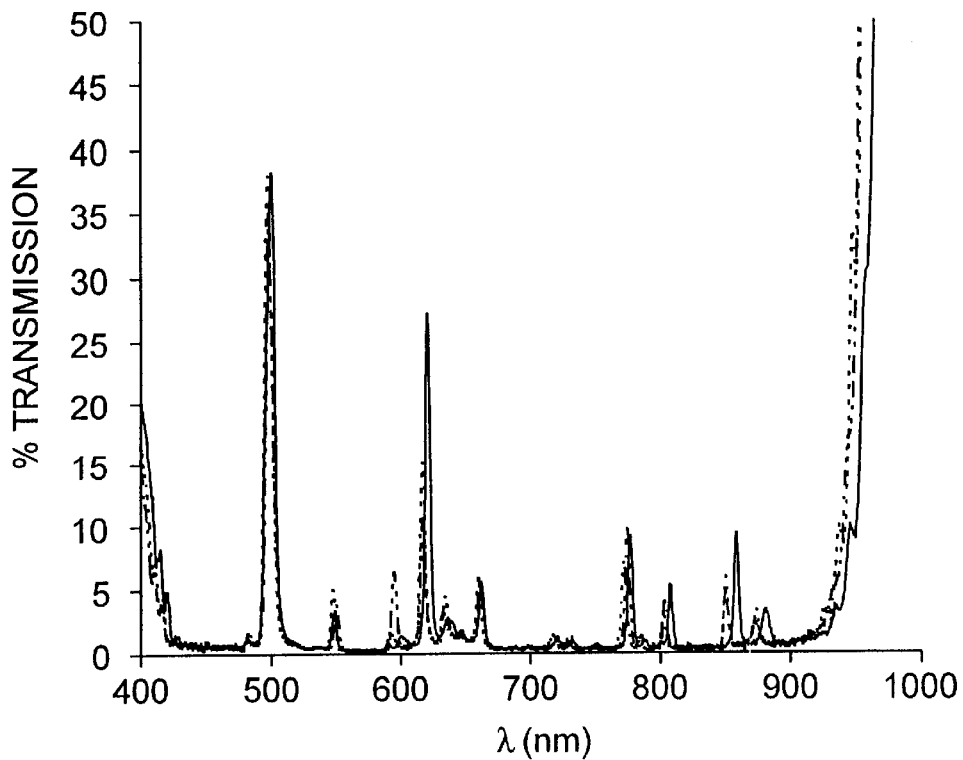
FIGS. 8A,8B show measured transmission spectra of a multilayer polymeric film useable in security applications.
Figure 8B:
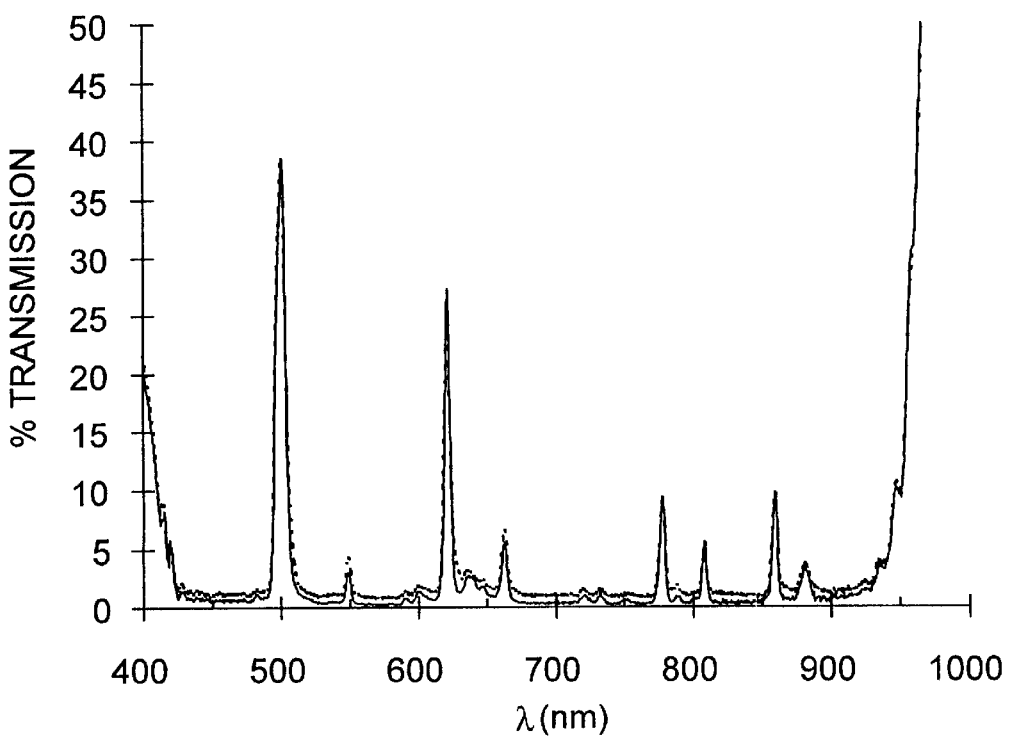

One example of a colored security film is depicted by the transmission spectrum shown in FIG. 8A, which shows the transmission spectrum of a 900 layer PEN:CoPEN polarizer designed to reflect broadband light within one plane of polarization. The blue bandedge is near 400 nm, but could easily be made to be at 500 nm so the article would be a bright blue colored polarizer, which would shift to gray at high oblique angles. The film of FIG. 8A shows a series of very narrow passbands (i.e. transmission bands), the major ones near 500 and 620 nm. These features are reproduced in the 3 spectra overlaid in FIG. 8A, with each spectra being taken at 3 cm intervals across the web starting at 20 cm from one edge of the film. FIG. 8B shows the spectra for the 20 cm position from the film edge, but this time for two points separated by 4 meters distance in a downweb direction. The passband at 500 nm has a peak transmission of 38 percent, and a bandwidth of 8 nm. The bandedge slopes are about 5 percent per nm. The narrower peak at 620 nm has similar bandedge slopes, but the bandwidth is 4 nm, with a peak transmission value of 27 percent. The two spectra are almost identical. The similarities of the spectra shown in FIGS. 8A and 8B indicate a high level of reproducibility of the layer structure, with the location of the 50% band edge controlled to better than +/−2 nm, or a range of about +/−0.4%. The width of constant spectral characteristics is on the order of a few cm. The length of film rolls from standard film making equipment can easily exceed one kilometer. Coupled with the width of a few cm of constant spectral characteristics, large areas of film with a unique spectral "fingerprint" can be made as a label with a security code. Such spectra are very difficult for a counterfeiter to duplicate because of the complexity of equipment design, and implementation of process details, including exact resin viscosity and molecular weight. Films having fine structure unique to a given production line setup can be easily reproduced by those skilled in the art using the techniques and materials taught herein.

More complex spectral fingerprints can be designed into the film to provide unique spectral bar-codes by selectively transmitting and reflecting desired wavelengths over a region of interest. Preferred film layer thickness profiles use the gradient design schemes described in co-pending application "Optical Film With Sharpened Bandedge" referenced above to provide sharp band edges which give sharp transitions between reflecting and transmitting regions.

Figure 9A:
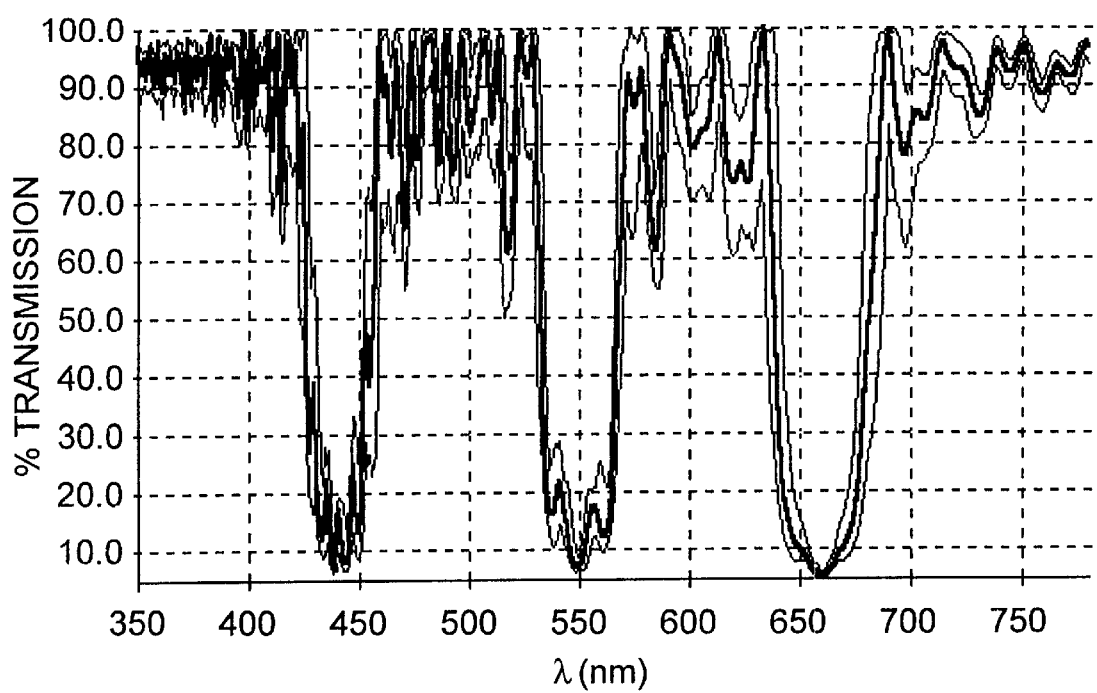
FIGS. 9A–C show computed transmission spectra of multilayer polymeric films useable in security applications.

FIG. 9A shows the computed spectra for a film constructed of three sets of 50 layers of PET and a 1.60 index co-PEN, with each set being either 0.8, 1.0, or 1.2 multiples of a 550 nm design wavelength. The layers in each set of 50 layers has an identical initial optical thickness. The upper and lower curves represent the extreme excursions of the spectra when each layer is varied by a 2% 1-σ standard deviation. This type of film construction is capable of encoding 9 to 10 bits of data over the spectral range of 400 to 1000 nm, which is equivalent to between 512 and 1024 individual codes. Additional codes may be generated by varying the intensity of each peak; thus, over one million different codes can be created by using only four different intensity levels.

Figure 9B:
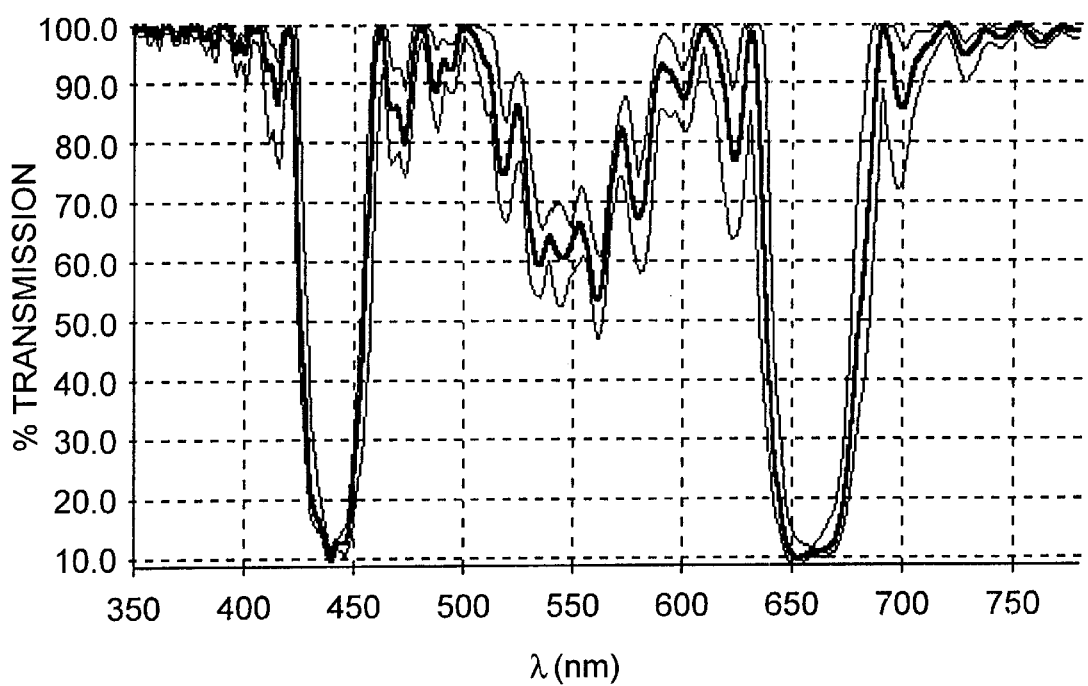

FIG. 9B shows the spectra as in FIG. 9A, except that the packets contain 50, 20, and 50 layers to vary the peak intensities rather than 50, 50, and 50 layers. There is considerable fine structure detail in the spectra of FIGS. 9A and 9B, and this detail can be used to specifically identify a particular item. The detail may be achieved by either relying on random variations in the product, or by intentionally varying the thickness of an individual layer or group of layers.

Figure 9C:
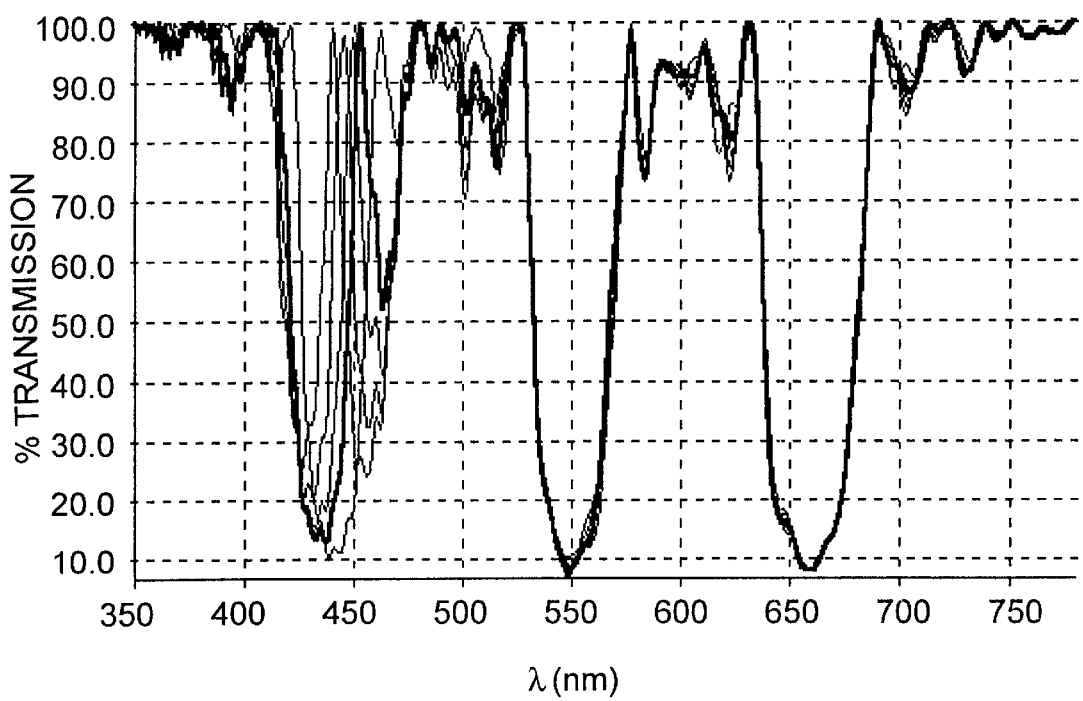

FIG. 9C shows the potential for individually serializing products with coded films to give a spectral bar-code. The five traces show how the spectrum changes if the system described for FIG. 9A is altered so that layer 25 (CoPEN, nominally 68 nm) is adjusted to be 0 nm, 6.3 nm, 13 nm, 26 nm, and 39 nm, respectively. The reflectivity of the peak at 550 nm is reduced corresponding to the smaller number of layers in that wavelength region. A product may be serialized in this way to the limit of feedblock technology, which has very high potential capability.

Information can also be encoded in the security films and optical bodies of the present invention by several other methods, either alone or in combination with the above described methods of varying the intensity and position of transmission and reflection bands. For example, individual layers may be tuned to the infrared portion of the spectrum, and overtones in the visible region can be controlled to produce unique spectra. The layers would be thicker than those used to produce the spectra of FIG. 9B, but there would be fewer layers needed, as more than one overtone can be created from a single stack in the infrared.

The use of extremely high or low f-ratios allows the production of very narrow band reflectors; alternately, reflecting bands can be made narrow by using a smaller refractive index difference between the materials making up the optical stack. The ratio of the optical thickness of the low and high index materials, which determines the f-ratio and the bandwidth of the first order peak, also controls the magnitude of the overtones. This design method can be used to produce narrow higher order harmonics that can be changed by process controls without the need for hardware changes in a feedblock.

As an example of how f-ratios can be varied to give a variety of spectral bar-codes from a single feed block, a stack can be made with the $1^{st}$ order peak placed at 1300 nm so that $2^{nd}$ and $3^{rd}$ order peaks will occur at approximately 650 and 450 nm. If another first order stack is added at 550 nm, three peaks appear in the visible region with varying intensity, depending on the f-ratio chosen during the manufacturing run.

Figure 10A:
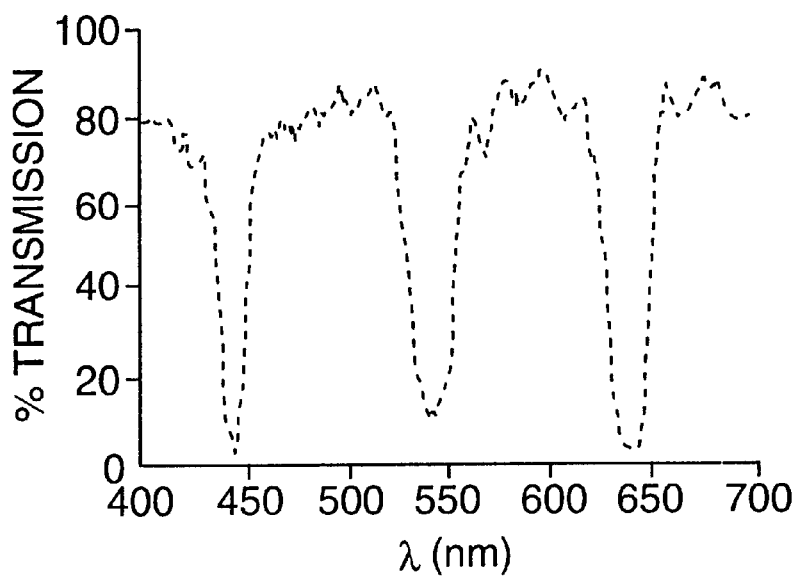
FIGS. 10A–C show computed transmission spectra of multilayer polymeric films using f-ratios of 0.18, 0.33, and 0.5 respectively.
Figure 10B:
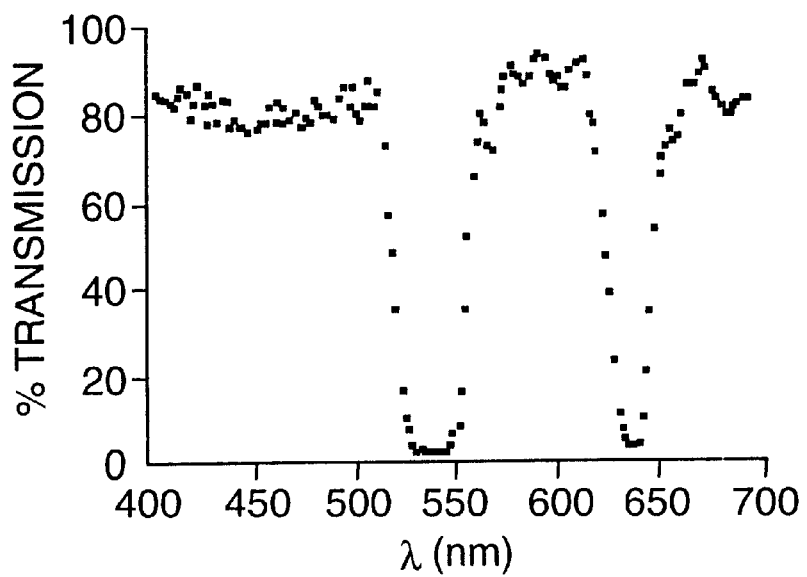
Figure 10C:
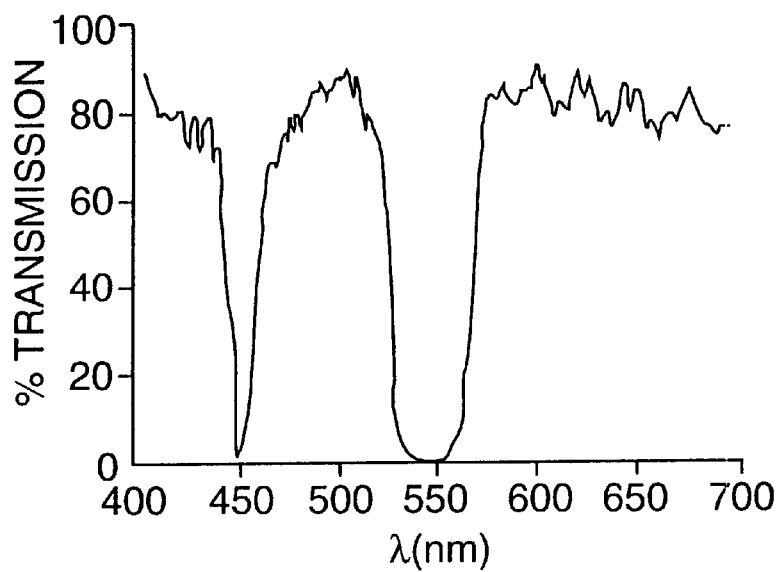
Figure 10D:
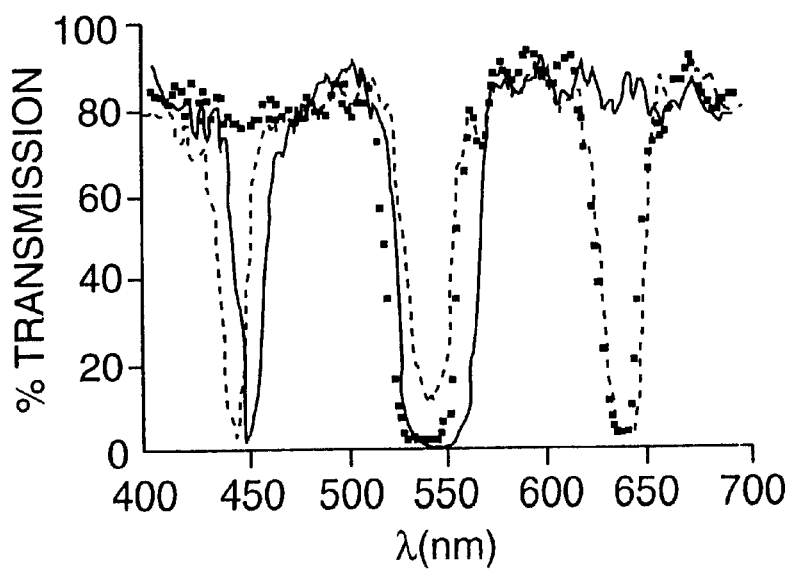
FIG. 10D shows a composite of FIGS. 10A–C.

Spectra for f=0.18, 0.33, and 0.5 are shown in FIGS. 10A to 10C, respectively, and in the composite graph in FIG. 10D. In FIG. 10A, with an f-ratio of 0.18, 3 peaks are visible: a $3^{rd}$ order peak at 440 nm, a first order peak at 550, and a second order peak at 640. With an f-ratio of 0.33, it is seen from FIG. 10B that the $3^{rd}$ order peak has disappeared, and the first order peak at 550 is stronger. In FIG. 10C, two peaks are visible again, but in this case, the second order peak at 640 is absent as expected, and the first order peak at 550 is at its highest reflectivity. As a variation of this scheme, the feedblock can be cut so that one of the stacks has a different f-ratio than the other and the first order peaks of both stacks can be placed in the IR, in which case changes in the high index/low index meltstream flow ratio will have different optical effects on the two stacks and their higher orders.

By combining the described "bar-code" multilayer films with a retroreflective layer, in a construction similar to FIG. 2, an article is produced which can readily be applied to various objects to be tagged and which can more easily be scanned, since precise angular alignment of the reader with the normal to the article is not required.

Multilayer Film Having Sharpened Spectral Transitions

Figure 11A:
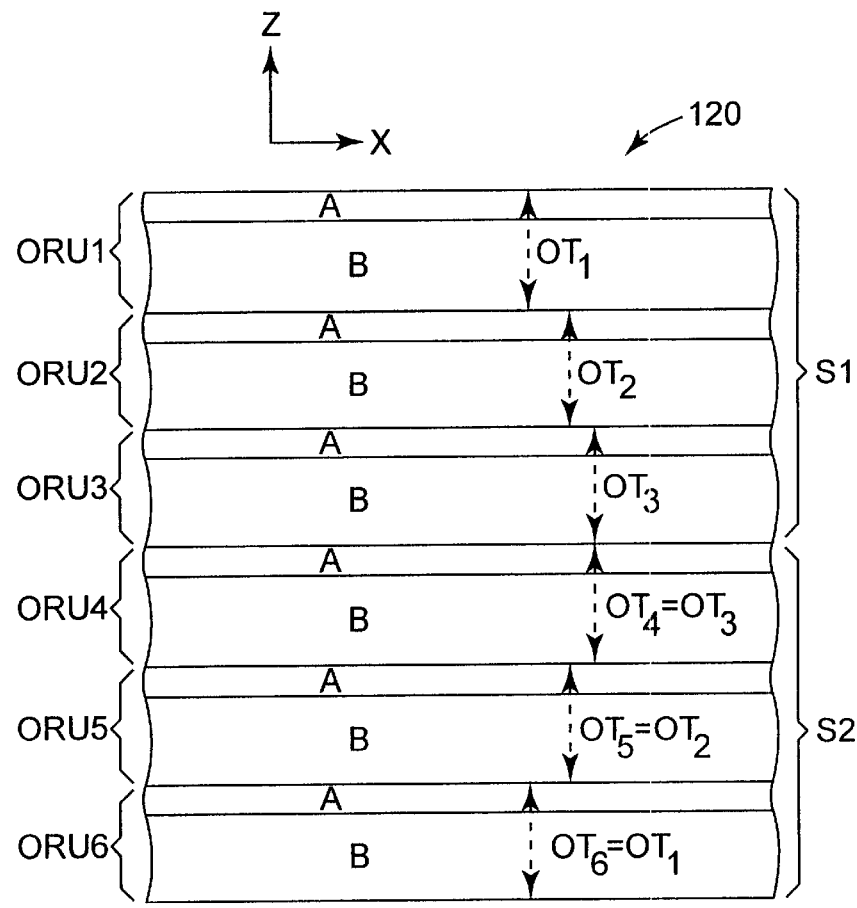
FIG. 11A shows an enlarged and exaggerated sectional view of a simplified multilayer film designed to exhibit sharp spectral transitions.
Figure 11B:
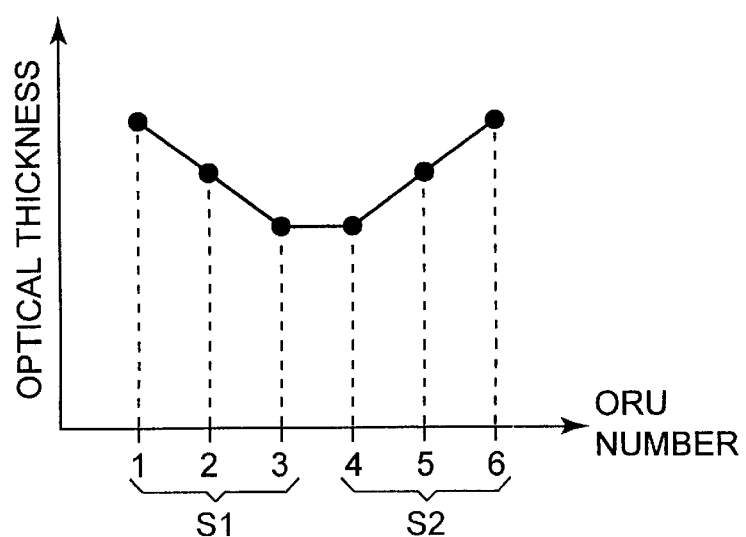
FIG. 11B is a graph of optical thickness of the optical repeating units (ORUs) comprising the film of FIG. 11A.

It has been found that multilayer films having certain film layer profiles can produce much sharper spectral transitions than previously achievable. FIG. 11A shows a cross-sectional view of a film structure which is not to scale but which is helpful in describing such desirable profiles. As shown, multilayer film 120 comprises 12 individual layers arranged in an alternating sequence of two optical materials: "A" and "B" material. Three or more distinct optical materials can be used in other embodiments. Each pair of adjacent "A" and "B" layers make up an ORU, beginning at the top of the film with ORU1 and ending with ORU6, with the ORUs having optical thicknesses $OT_1$, $OT_2$, . . . $OT_6$. These optical thicknesses are the same as the term "$D_r$" identified in equation I above. For maximum first order reflectance (M=1 in equation I) at a design wavelength, each of the ORUs should have a 50% f-ratio with respect to either the A or B layer. The A layers can be considered to have a higher X- (in-plane) refractive index than the B layers, since the former are shown thinner than the latter. ORUs 1–3 are shown grouped into a multilayer stack S1 in which the optical thickness of the ORUs decrease monotonically in the minus-Z direction. ORUs 4–6 are shown grouped into another multilayer stack S2 in which the optical thickness of the ORUs increase monotonically. This ORU optical thickness profile is depicted in FIG. 11B. Thickness profiles such as this are helpful in producing sharpened spectral transitions. Before proceeding with examples of such preferred profiles, however, an example of a bandpass filter without band edge sharpening will be described.

Figure 12A:
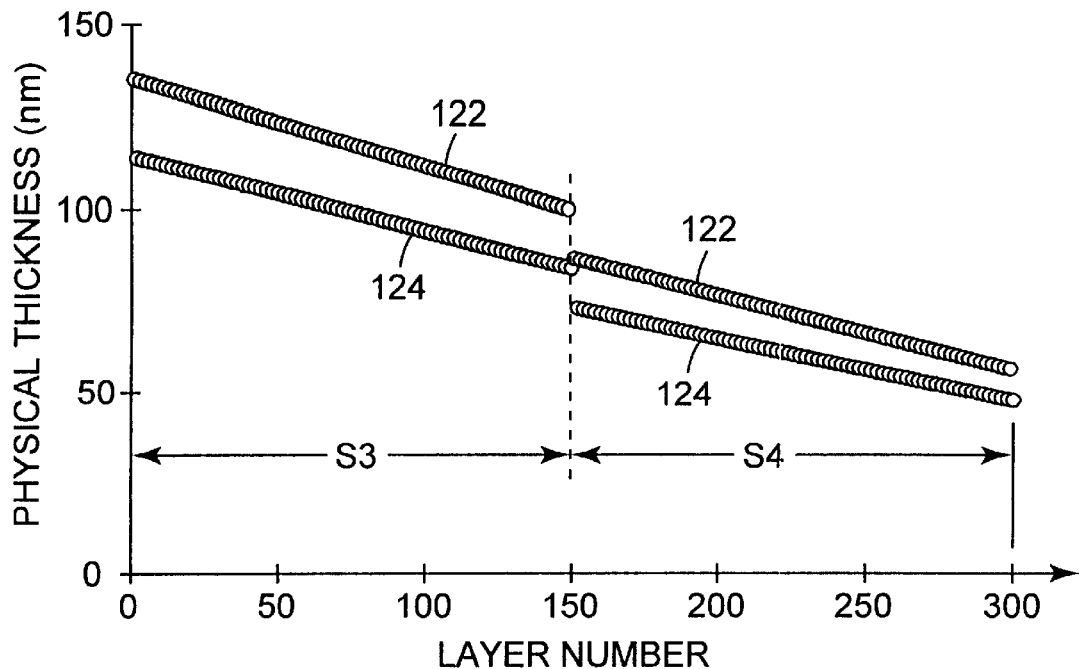
FIG. 12A is a graph of physical thickness of individual layers of a bandpass multilayer film.
Figure 12B:
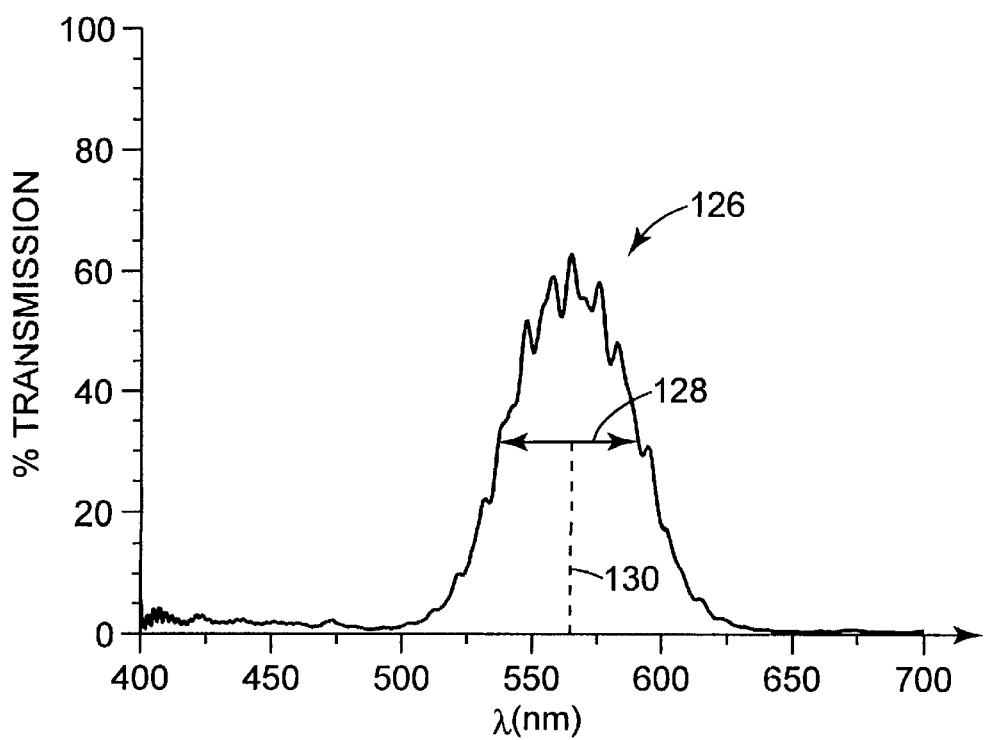
FIG. 12B is a computed on-axis transmission spectrum of the film of FIG. 12A.

FIG. 12A illustrates the design of a bandpass multilayer film made up of 300 individual layers. The physical thickness of each individual layer in the film is shown, beginning at the top or front of the film and proceeding toward the bottom or back of the film. Data points 122 represent a material having an in-plane refractive index of 1.5 (e.g., PMMA) and points 124 represent a material having an in-plane refractive index of 1.75 (e.g. PEN). Layer numbers 1 and 2 constitute the "first" ORU, layers 3 and 4 constitute the second ORU, and so on. The optical thickness of a given ORU equals the sum of the optical thickness of the high and low index layer. Layers 1 to 150 constitute a first multilayer stack S3 and layers 151 to 300 constitute a second multilayer stack S4. Both such component stacks have a monotonically decreasing ORU optical thicknesses. The discontinuity in optical thickness between the two stacks gives rise to a simple notch transmission band 126, shown in FIG. 12B. FIG. 12B was calculated from the multilayer film of FIG. 12A using the 4×4 matrix methods of Berreman as outlined in Azzam & Bashara, *Ellipsometry And Polarized Light*, assuming normally incident light and constant refractive index as a function of wavelength (no dispersion). Band 126 has a peak transmission of about 60%, a full width at half maximum 128 of about 50 nm, and a center wavelength as shown by line 130 of about 565 nm. The fractional bandwidth of band 126 is slightly below 10%. Reflectance is at least 80% over about 75% of the visible spectrum.

Figure 13A:
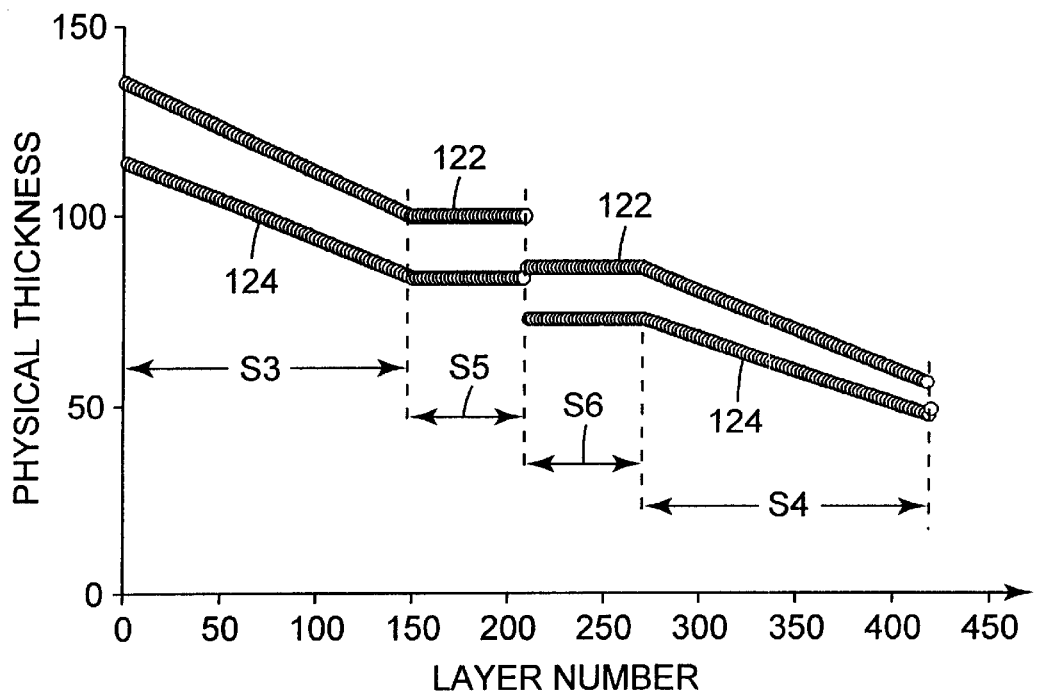
FIG. 13A is a graph of physical thickness of individual layers of a bandpass multilayer film having sharper spectral transitions.
Figure 13B:
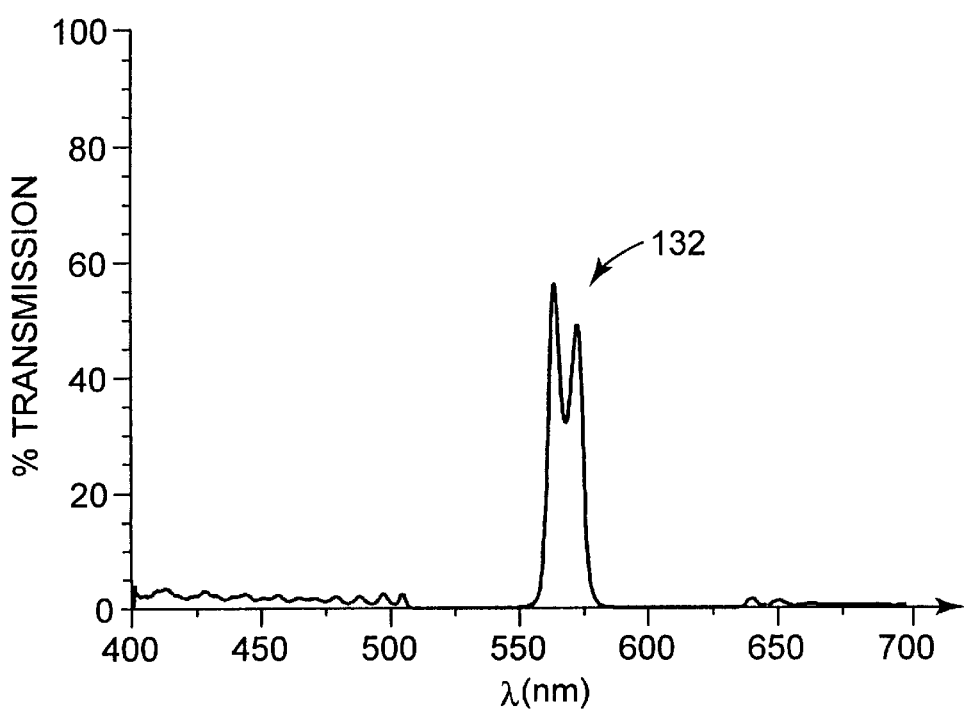
FIG. 13B is a computed on-axis transmission spectrum of the film of FIG. 13A.

A film having a much smaller fractional bandwidth can be made by providing additional layers (ORUs) having a particular optical thickness profile which have the effect of sharpening the spectral cut-on and cut-off transitions. FIG. 13A illustrates the design of such a film. Data points 122,124 stand for the same materials as in FIG. 12A, having refractive indices 1.5 and 1.75 respectively, and the series of 150 layers in multilayer stacks S3 and S4 have the same graded linear thickness distribution as in FIG. 12A. The film of FIG. 13A simply adds stacks S5, S6 having substantially constant (non-graded) optical thickness ORUs between stacks S3,S4. The ORUs of stack S5 have an optical thickness substantially equal to the minimum optical thickness of stack S3, and the ORUs of stack S6 have an optical thickness substantially equal to the maximum optical thickness of stack S4. The same relationship also applies to each constituent of the ORUs. The calculated on-axis spectrum for the illustrated stack is given in FIG. 13B, showing a much sharper transmission band 132. The percent bandwidth of band 132 is on the order of 3% or less.

Figure 14A:
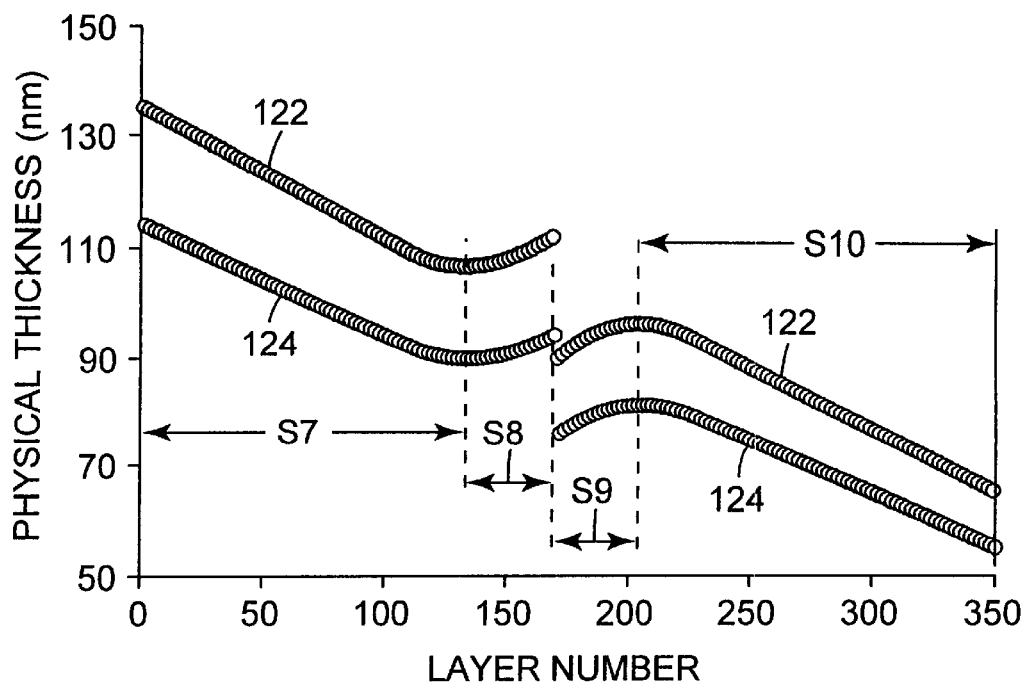
FIG. 14A is a graph of physical thickness of individual layers of a bandpass multilayer film having still sharper spectral transitions.

Another multilayer film, whose design is shown in FIG. 14A, was created to improve peak transmission and to make even steeper band edges (narrower transmission band). This was achieved with the same materials used for data points 122,124, by arranging the individual layers into component multilayer stacks S7–S10 as shown, where the stacks S8 and S9 have oppositely curved thickness profiles and the adjacent portions of stacks S7 and S10 have a slightly curved profile to match the curvature of stacks S8 and S9, respectively. The curved profile can follow any number of functional forms; the main purpose of the form is to break the exact repetition of thickness present in a quarter wave stack with layers tuned to only a single wavelength. The particular function used here is an additive function of a linear profile (the same as used on the short wavelength side of S7 and the long wavelength side of S10) and a sinusoidal function to curve the profile with an appropriate negative or positive first derivative. An important feature is that the second derivative of the ORU thickness profile be negative for the red (long wavelength) band edge of a reflectance stack and positive for the blue (short wavelength) band edge of a reflectance stack. Note that the opposite sense is required if one refers to the band edges of the notched transmission band. Other embodiments of the same principle include layer profiles that have multiple points with a zero value of the first derivative. In all cases here, the derivatives refer to those of a best fit curve fitted through the actual ORU optical thickness profile, which can contain small statistical errors of less than 10% sigma one standard deviation in optical thickness values.

Figure 14B:
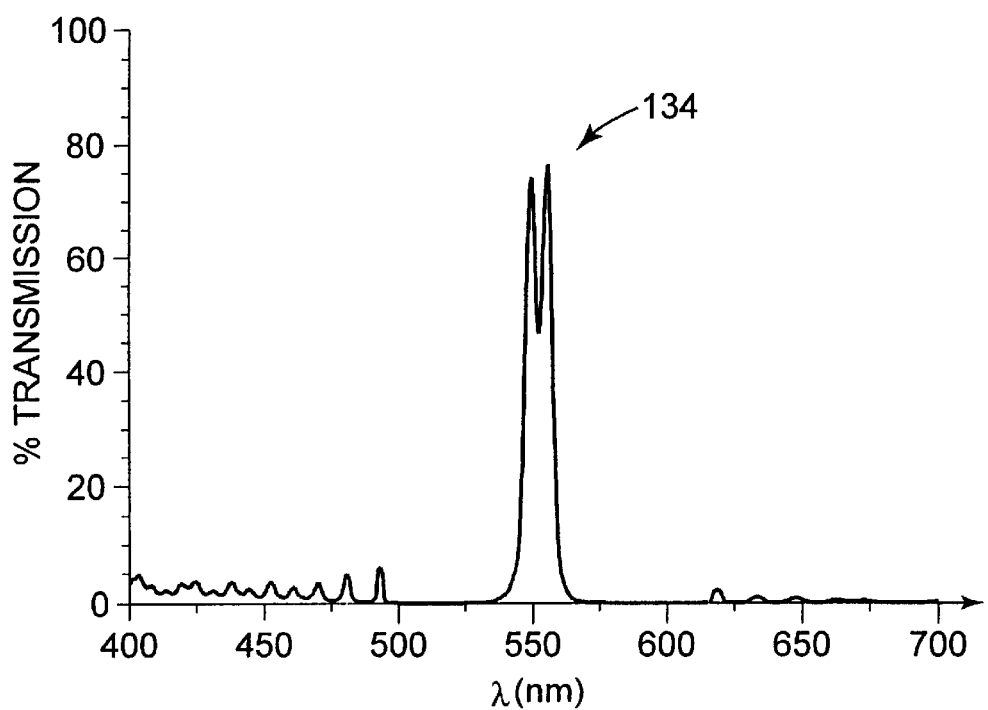
FIGS. 14B and 14C show computed on- and off-axis transmission spectra respectively of the film of FIG. 14A.
Figure 14C:
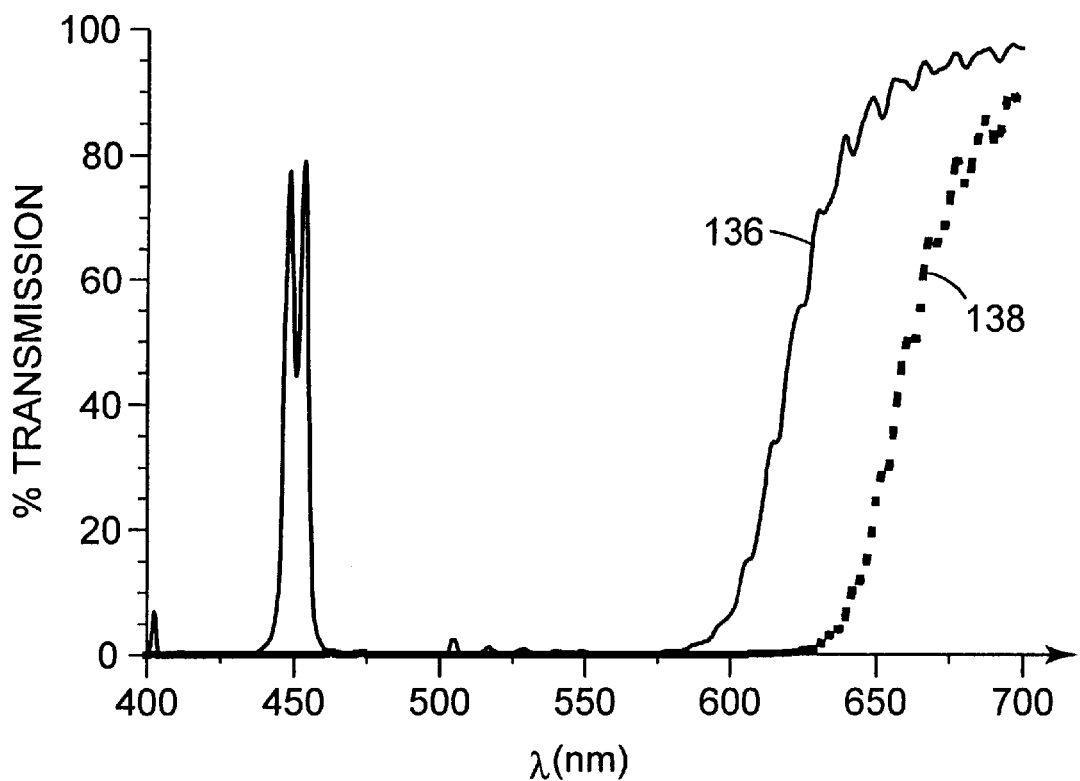

FIG. 14B shows the calculated on-axis transmission of the film of FIG. 14A. Peak transmission of the band 134 is above 75%, and fractional bandwidth is on the order of 2% or less. Off-axis transmission spectra, for both p- and s-polarizations, were also calculated and are shown as curves 136, 138 respectively in FIG. 14C. The calculation was done for an entrance angle of 60 degrees and assumed that the out-of-plane refractive indices of the two types of layers were matched, at an index of 1.5. Note the preservation of the high peak transmission and the small fractional bandwidth for p-polarization. Note also that the transmission peak for s-polarization has disappeared. However, broader transmission bands which were disposed in the near infrared region on-axis are now visible for both s- and p-polarization in the red end of the spectrum in FIG. 14C.

Similar transition-sharpening techniques can used for multilayer films having broader transmission features, such as high- or low-pass filters. Several such examples are given below. In some embodiments the physical thickness of each layer constituting an ORU is varied at the same pace across the thickness of the film, for example according to the same linear function, while in others the thickness of the layers constituting an ORU are varied differently. In each of the following examples the high and low index layers have an index of 1.75 and 1.5, respectively, and are dispersionless.

Example Articles

Example 1 Article: Wide Band Reflector on Linear Prismatic Retroreflector

Figure 3C:
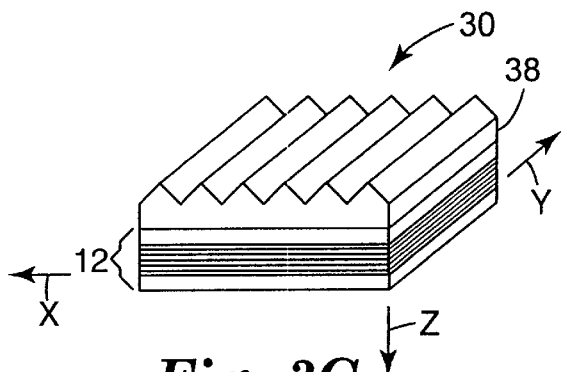
FIGS. 3C and 3D are perspective rear views showing different structured surfaces capable of exhibiting the behavior depicted in FIGS. 3A and 3B.
Figure 3D:
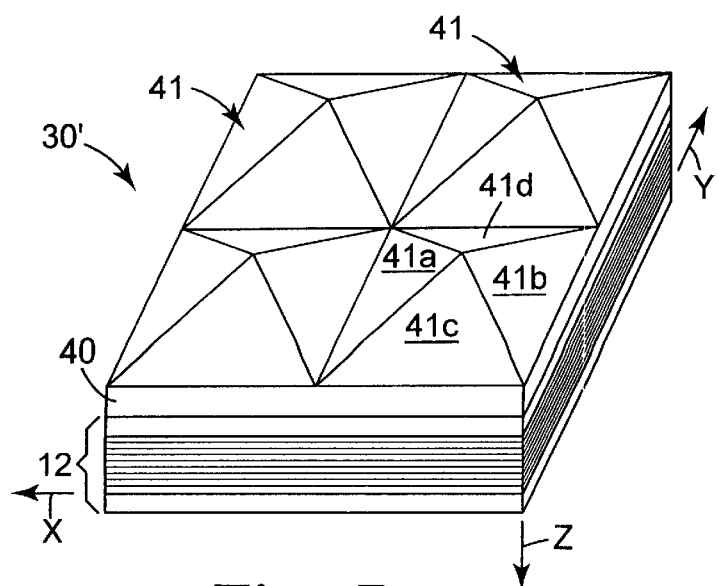
Figure 19:
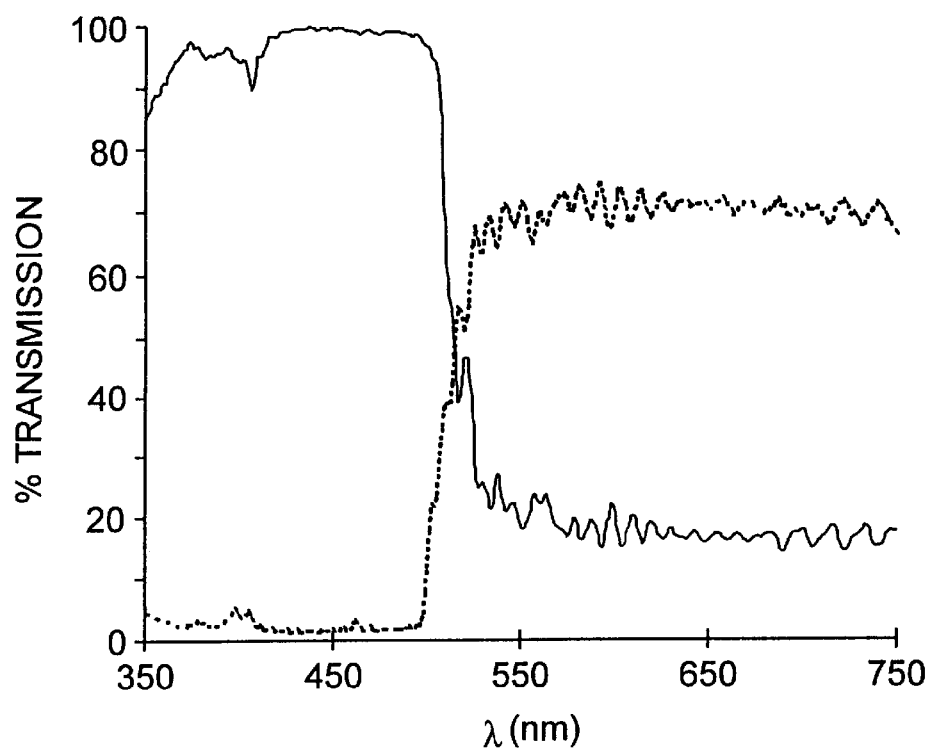
FIG. 19 shows measured reflectance spectra of the Example 1 article.

An article similar to that of FIG. 3C was constructed by laminating a multilayer polymeric film to a linear prismatic retroreflective layer. The linear prismatic layer used was Optical Lighting Film commercially available from 3M Company. The multilayer film had 601 individual layers, and visually appeared yellow in transmitted light and blue in reflected light. Separated reflected color images of overhead fluorescent lights could be seen simultaneously in the two different colors. Viewed from the prismatic side above a black background, only blue images were visible. On a diffuse white background, both colors could be seen but the yellow dominated. Viewed from the other side, both yellow and blue images could be seen, with the two images being oriented at different angles. The spectra of these two images are shown in FIG. 19. The dashed line is for retroreflected light, and includes two passes through the multilayer film. The solid line is for light specularly reflected from the multilayer film. These spectra were measured in a Perkin-Elmer lambda-9 spectrophotometer by orienting the sample grooves at two different angles. The retroreflected component could be captured in an integrating sphere because the article was retroreflective only in one plane. Note that the two curves represent essentially complementary colors, and in effect represent both the reflection and transmission spectra of the multilayer film alone.

Example 2 Article: Linear Prismatic Retroreflector Cast on Multilayer Film

A sheet of multilayer dichroic mirror film comprising alternating layers of polyester terephthlate and ECDEL was primed with a solution of 3% benzophenone in 1,6-hexanediol diacrylate. The primer was then cured at a linespeed of 50 feet/min in an atmosphere of air using a

|  | S11 | S12 | S13 | S14 | S15 |
|---|---|---|---|---|---|
| Total number of layers | 170 | 30 | 30 | 30 | 30 |
| High index beginning layer thickness (nm) | 154.6 | 112.4 | 112.4 | 112.4 | 112.4 |
| High index layer thickness increment (nm) | −0.4965 | 0.726 | 0.726 | 0 | 0.726 |
| Low index beginning layer thickness (nm) | 183.3 | 133.3 | 133.3 | 133.3 | 133.3 |
| Low index layer thickness increment (nm) | −0.5882 | 0.8608 | 0 | 0 | −0.5882 |
| Beginning ORU optical thickness (nm) | 545.5 | 396.65 | 396.65 | 396.65 | 396.65 |
| ORU optical thickness increment (nm) | −1.7512 | 2.5617 | 1.2705 | 0 | 0.3882 |

Figure 15A:
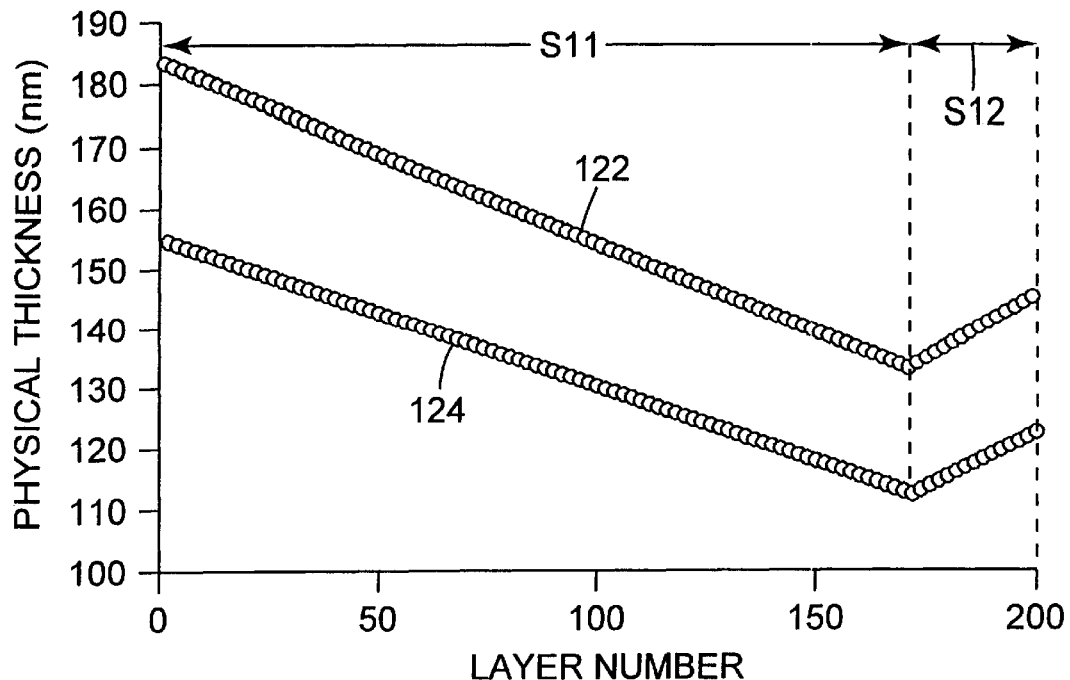
FIGS. 15A, 16A, 17A, and 18A are graphs of physical thickness of individual layers of additional multilayer films.
Figure 15B:
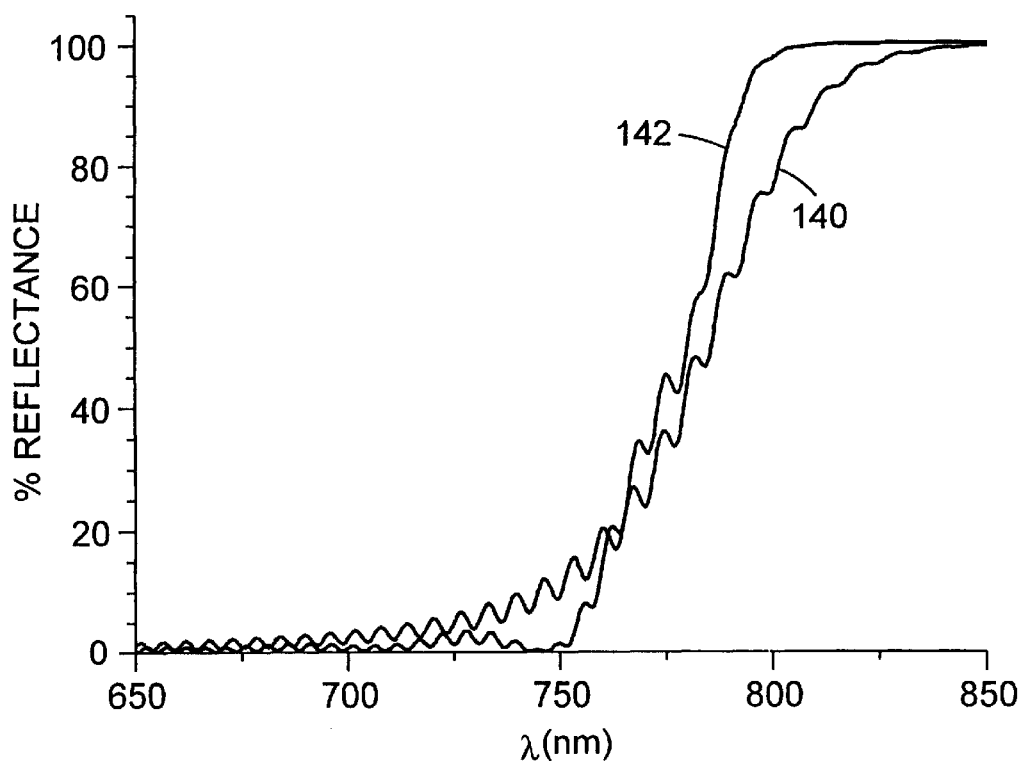
FIGS. 15B, 16B, 17B, and 18B show computed on-axis reflectance spectra of the respective films.
Figure 16A:
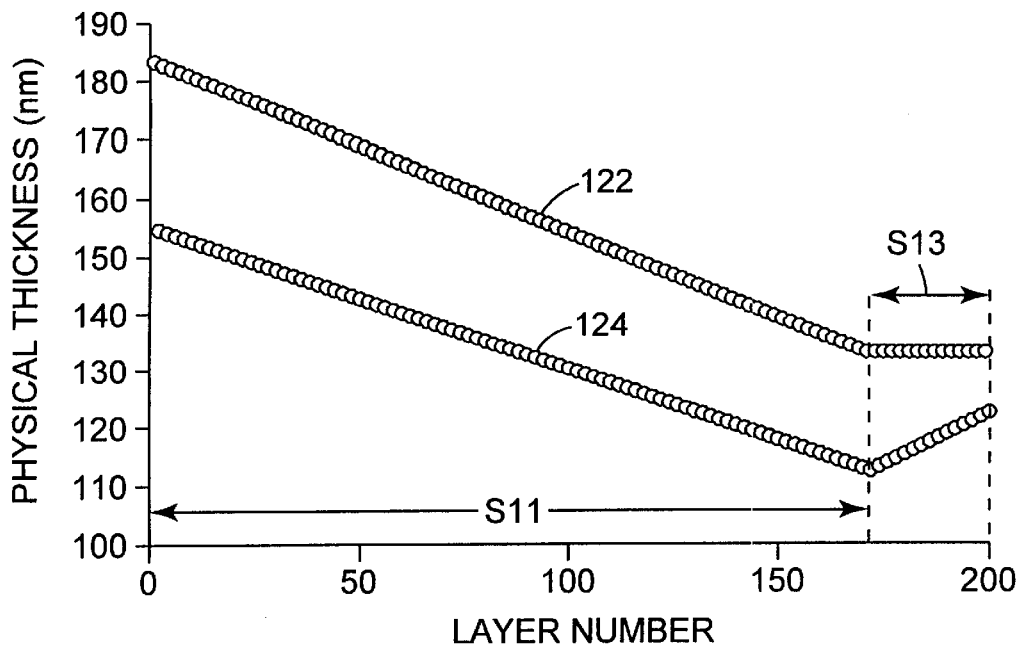
Figure 16B:
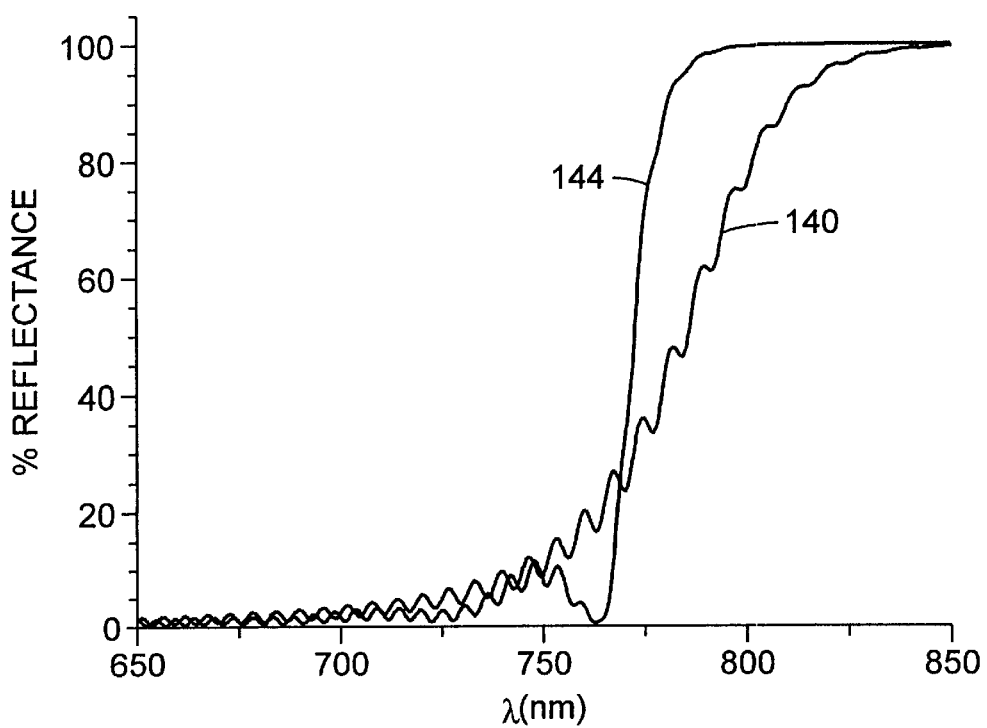
Figure 17A:
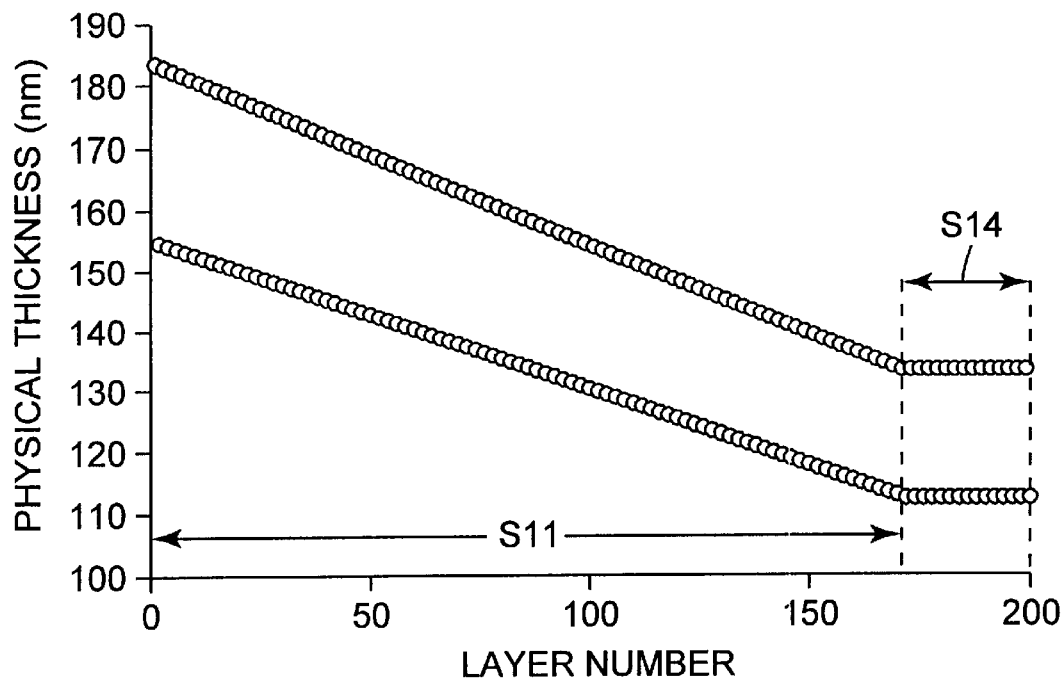
Figure 17B:
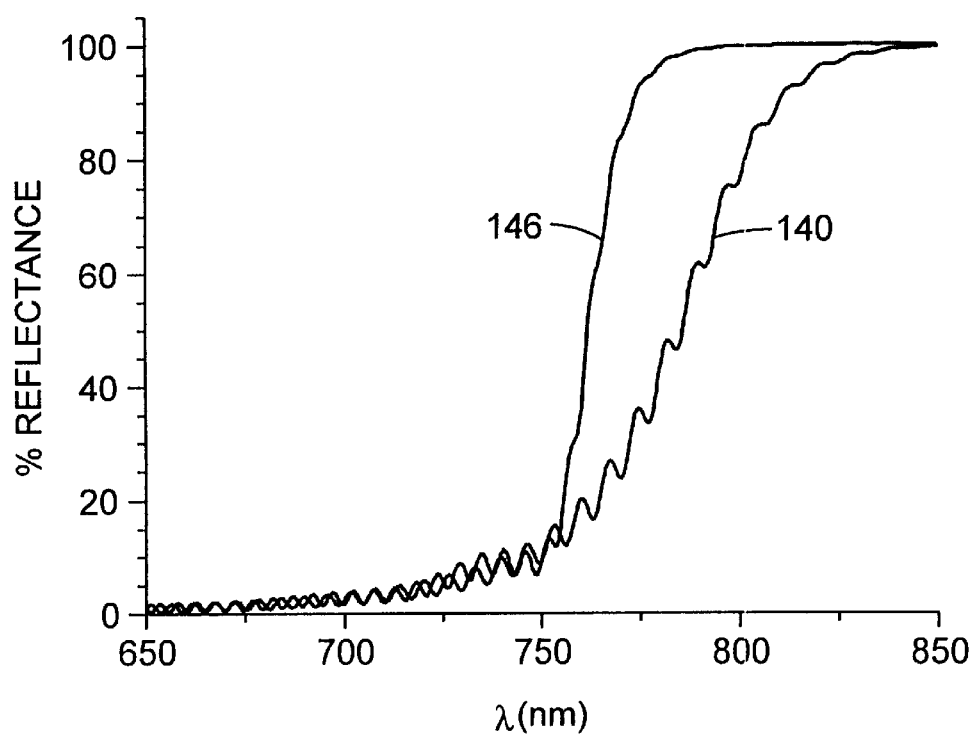
Figure 18A:
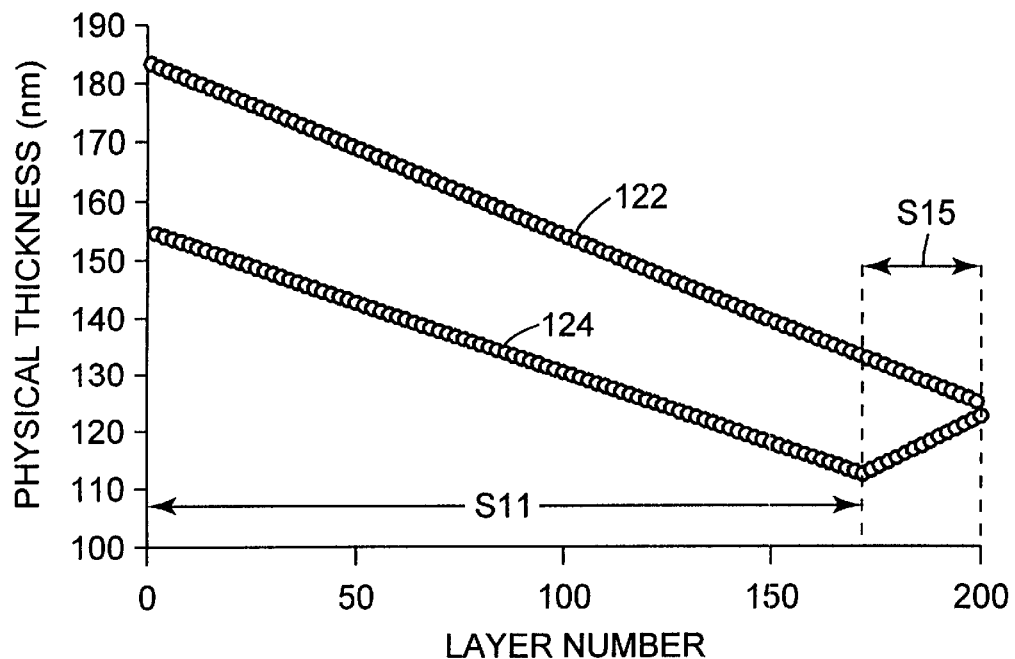
Figure 18B:
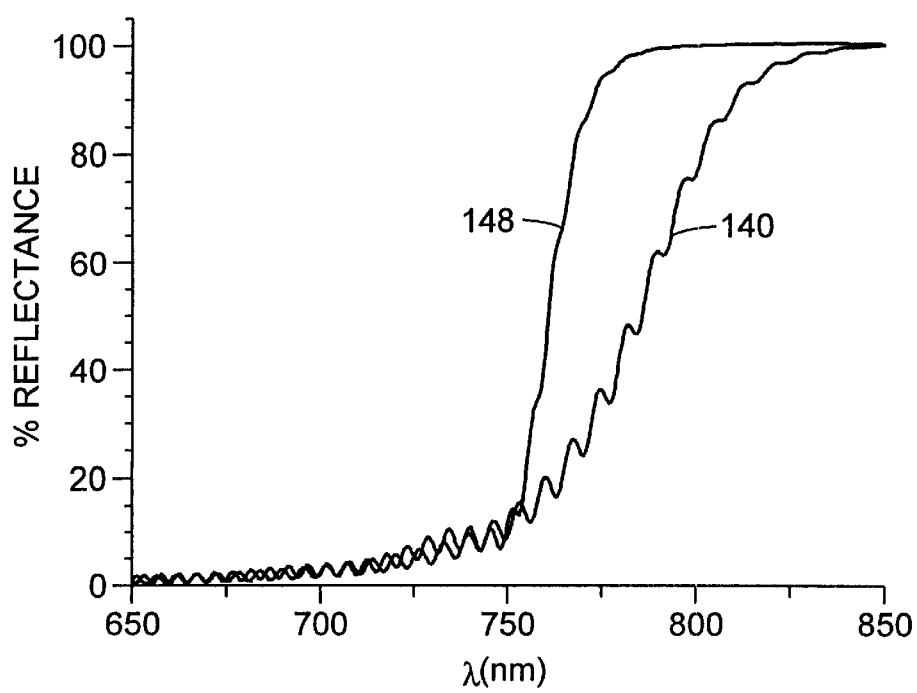

The component multilayer stack S11 serves as a baseline film design. An on-axis reflectance spectrum 140 was calculated for stack S11 alone, and then for the film combinations: S11+S12 (see FIG. 15A for physical thickness profile and FIG. 15B for reflectance curve 142); S11+S13 (see FIG. 16A for physical thickness profile and FIG. 16B for reflectance curve 144); S11+S14 (see FIG. 17A for physical thickness profile and FIG. 17B for reflectance curve 146); and S11+S15 (see FIG. 18A for physical thickness profile and FIG. 18B for reflectance curve 148). As seen from the figures, the addition to stack S11 of a stack with a reverse thickness gradient (stack S12), a stack with a reverse thickness gradient with f-ratio deviation (stack S13), a stack with a substantially zero thickness gradient (stack S14), and a stack with a reverse thickness gradient using only one component of the ORUs (stack S15) have progressively desirable effects on the sharpness of the spectral transition.

Figure 20:
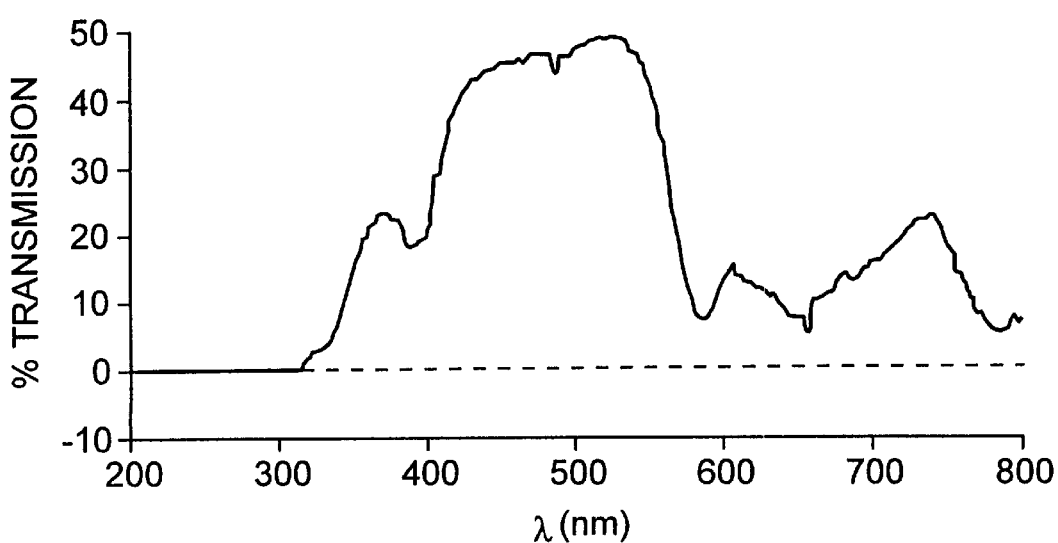
FIG. 20 shows measured transmission specta of the Example 2 article and the multilayer film used therein.

Fusion "H" ultraviolet lamp operating at 300 W/in. A resin blend of Ebecryl 600 (25 parts)/trimethylolpropane triacrylate (50 parts)/tetrahydrofurfuryl acrylate (25 parts) containing 1% by weight Darocur 4265 was then prepared. The resin was cast between an electroform tool (mold) for a linear prismatic film, such film being available from 3M Company under the designation BEF II 90/50, and the primed side of the multilayer film using an ink roller. The resin was cured at 25 ft/min by irradiating through the film using a Fusion "D" ultraviolet lamp operating at 300 W/in. After removing the composite film from the tool, the grooved side of the composite was irradiated with the Fusion "D" lamp operating at 300 W/in in an air atmosphere at 25 ft/min. The on-axis transmission spectrum of the dichroic mirror film (solid line) and of the composite article (broken line) are shown in FIG. 20. The dichroic mirror film was partially transparent, but the addition of the structured surface microprisms enhanced the reflectivity of the film.

Example 3 Article: IR Reflectingp Film With Cube Corner Retroreflector

Figure 21A:
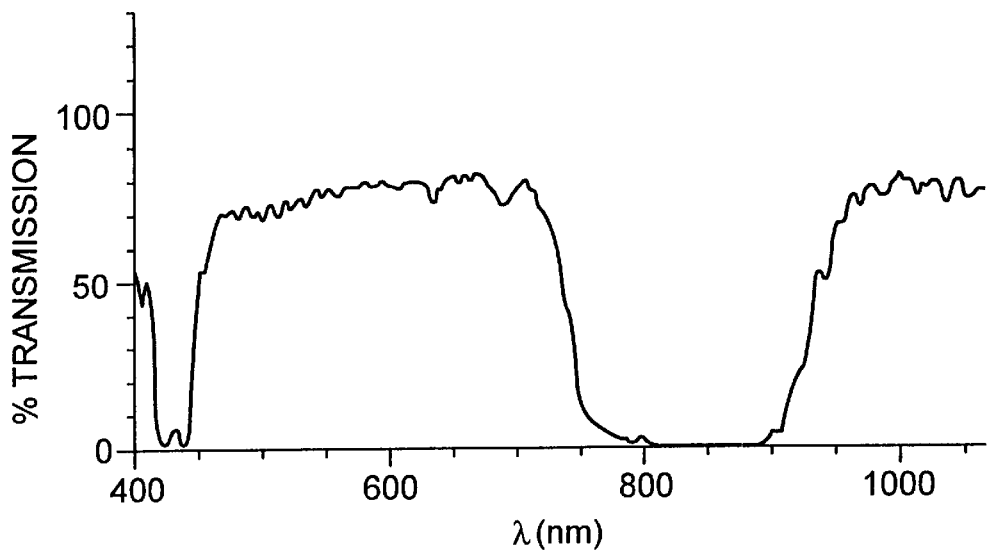
FIGS. 21A,B show transmission spectra at 0 and 40 degree entrance angle respectively of the Example 3 article.
Figure 21B:
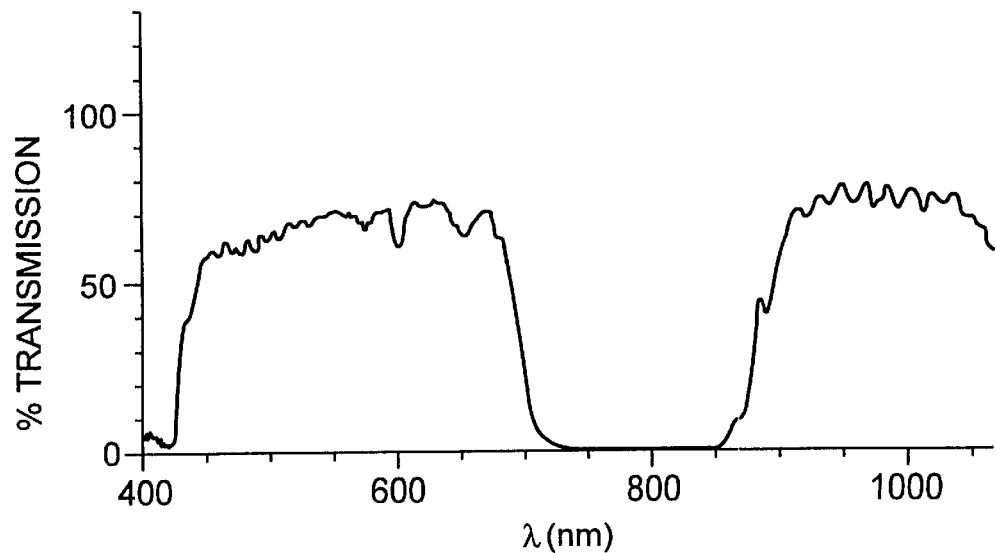

A sheeting having a construction similar to that shown in FIG. 2 was prepared by laminating a dichroic mirror film to a cube corner retroreflective sheet. The mirror film had relatively low reflectance (high transmission) throughout most of the visible region at small entrance angles. The film also had a relatively wide reflection band (about 175 nm full width at half maximum) centered in the near infrared at about 840 nm. The wide reflection band ensures that selected near infrared wavelengths, e.g. 790–820 nm, will be reflected by the film over a wide range of entrance angles. FIG. 21A shows an on-axis transmission spectrum of the film and FIG. 21B shows a transmission spectrum (believed to include both s- and p-polarizations) at a 40 degree entrance angle. The retroreflective sheet had the same cube corner geometry as type 981 Scotchlite™ brand retroreflective sheeting available from 3M Company, and included an aluminum vapor coat on the cube corner structured surface. The retroreflective sheet included an adhesive layer on the aluminum vapor coat, but did not include a seal layer heat-sealed against the structured surface. The composite sheeting included a protective film (see layer 28 in FIG. 3) laminated on top of the mirror film. The protective film used was type 1171 ElectroCut™ film available from 3M Company, which comprises an acrylic film with an acrylic adhesive backing. The acrylic film includes a yellow dye, to enhance visibility of the composite sheeting. The protective film was intended to make the composite sheeting sufficiently durable for outdoor applications.

Retroreflective measurements taken at a variety of entrance angles and orientation angles yielded the following:

| Entrance Angle (deg) | Orientation Angle (deg) | Coeff of Retroreflection (candelas per lux per m$^2$) |
|---|---|---|
| −4 | 0 | 2400 |
| −20 | 0 | 1590 |
| −20 | 45 | 2260 |
| −20 | 90 | 2355 |
| −20 | 135 | 2232 |
| −40 | 0 | 430 |
| −40 | 45 | 789 |
| −40 | 90 | 990 |
| −40 | 135 | 806 |

This Example 3 article was constructed for a search and rescue application in which the article would be applied to the outside of an airplane. In the event the airplane crashed, a search aircraft flying high overhead would sweep the ground with two lasers operating at different wavelengths. The retroreflective/reflective sheeting on the downed airplane would then retroreflect one wavelength (one at which the mirror film transmits) back toward the search aircraft and specularly reflect the other wavelength (one at which the mirror film reflects) in a direction other than toward the search aircraft. Detection of only one of the two wavelengths (at a specified minimum constrast ratio) provides a positive indication of the presence of the downed airplane. By using a mirror film that has a high transmission in the visible region, the resulting sheeting has all the advantages of conventional retroreflective sheeting in that it remains highly visible to the human eye; the mirror film is "transparent" to ordinary observers. Application to objects other than aircraft, such as clothing, lifevests, and so on, is also contemplated.

This Example 3 article is superior to alternatives which achieve wavelength differentiation using IR absorbing dyes, which are unstable to moisture exposure, or vapor coated dielectric stacks, which are expensive and have poor entrance angularity.

The construction details of the mirror film will now be discussed. The mirror film was a multilayer film containing about 417 layers, made on a sequential flat-film making line via a coextrusion process. This multilayer polymer film was made with from PEN and PETG 6763 (available from Eastman Chemical Co.). A feedblock method (such as that described by U.S. Pat. No. 3,801,429) was used to generate about 209 layers with an approximately linear layer thickness gradient from layer to layer through the extrudate. Polyethylene Naphthalate (PEN —60 wt. % phenol/40 wt. % dichlorobenzene) with an Intrinsic Viscosity (IV) of 0.48 dl/g was delivered to the feedblock by one extruder at a rate of 37.9 Kg/hr. The PETG was directed to the feedblock by a second extruder at a rate of 40.4 Kg/hr.

The feedblock used to make the film for this example was designed to give a linear layer thickness distribution with a 1.5:1 ratio of thickest to thinnest layers under isothermal conditions.

After the feedblock, the same PEN extruder delivered PEN as protective boundary layers (PBL's, same thickness on both sides of the optical layers meltstream) to the meltstream at about 23 Kg/hr. The material stream then passed though an asymmetric two times multiplier with a multiplier ratio of about 1.50. The multiplier ratio is defined as the average layer thickness of layers produced in the major conduit divided by the average layer thickness of layers in the minor conduit. Each set of 209 layers has the approximate layer thickness profile created by the feedblock, with overall thickness scale factors determined by the multiplier design and film extrusion rates. The thinnest layers of the entire stack were designed to reflect 810 nm radiation at normal incidence.

After the multiplier, a thick symmetric PBL (skin layer) was added at about 34.5 Kg/hr that was fed from a third extruder. Then the material stream passed through a film die and onto a water cooled casting wheel using an inlet water temperature of about 7° Celsius. The PETG melt process equipment was maintained at about 250° C.; and the PEN melt process equipment was maintained at about 285° C. and the feedblock, multiplier, and die were also maintained at about 285° C.

A high voltage pinning system was used to pin the extrudate to the casting wheel. The pinning wire was about 0.17 mm thick and a voltage of about 5.5 kV was applied. The pinning wire was positioned manually by an operator to about 3 to 5 mm from the web at the point of contact to the casting wheel to obtain a smooth appearance to the cast web. The cast web was continuously oriented by conventional sequential length orienter (LO) and tenter equipment.

The web was length oriented to a draw ratio of about 3.3 at about 130° C. The film was preheated to about 138°C. in about 28 seconds in the tenter and drawn at about 140° C. in the transverse direction to a draw ratio of about 5.5 at a rate of about 15% per second. The film was then heat set for about 24 sec at about 227° C. The casting wheel speed was adjusted for precise control of final film thickness, and therefore, final wavelength selection of the reflector. The finished film had a final thickness of about 0.10 mm.

Example 4 Article: Multilayer Polarizer on Cube Corner Retroreflector

The introduction of polarized headlights to motorized vehicles raises new challenges for manufacturers of retroreflective sheeting used for roadsigns. A problem arises when the light from the headlight is depolarized by the sheeting, and subsequent loss of brightness of the retroreflected beam through the driver's polarized visor or windshield. Both cube corner sheeting and beaded sheeting tends to scramble the polarization of incident light, converting linearly polarized light to elliptically polarized.

A possible solution is to laminate a multilayer polarizer film to the retroreflective layer as seen in FIG. 2, with the transmission axis of the polarizer film oriented to match the polarization direction of oncoming headlights. In this way all incident light from the headlight is transmitted to the retroreflective sheeting, but not all of this light will exit on the first pass. Only the component still parallel to the transmission axis will return to the source. The rest will re-enter the retroreflective layer, will again be retroreflected, with a portion exiting again. With the low losses in both multilayer polarizer film and cube corner retroreflective sheeting, recycling will continue with approximately 90% of the light retroreflected and of the correct polarization. A sample was prepared by laminating a polymeric polarizing film to commercially available Diamond Grade™ sheeting available from 3M Company. The sample was viewed side by side next to an unlaminated piece of Diamond Grade™ sheeting with a flashlight from a distance of 10 feet. For an unpolarized flashlight, the laminated sample was significantly dimmer as expected. With a polarized light source, the laminated sample was only slightly dimmer than the unlaminated sample. Viewing the same setup through a polarizer, the laminated sample was brighter.

Alternative embodiments from those described in the present application can use the class of reflective polarizers and mirrors made from blend optical films in place of the multilayer polymeric films discussed above. In a typical blend film, a blend of at least two different materials is used. A mismatch in refractive indices of the two or more materials along a particular axis can be used to cause incident light which is polarized along that axis to be substantially scattered, resulting in a significant amount of reflection. Incident light which is polarized in the direction of an axis in which the refractive indices of the two or more materials are matched will be transmitted with a much lesser degree of scattering. By controlling the relative refractive indices of the materials, a variety of optical devices can be constructed, including reflective polarizers, mirrors, and the like. Blend films may assume a number of different forms. For example, the blend may be formed of a disperse phase within a continuous phase or may be formed of co-continuous phases. The general formation and optical properties of various blend films are further discussed in commonly assigned U.S. patent application Ser. No. 08/610,092, filed Feb. 29, 1996, entitled "Diffusely Reflecting Polarizing Element Including a First Birefringent Phase and a Second Phase", and Ser. No. 08/801,329, filed Feb. 18, 1997, entitled "Optical Film with Co-Continuous Phases", the contents of which are incorporated herein by reference.

Glossary of Certain Terms

Datum Mark: a mark (whether real or hypothetical) on a reflective article that is used as a reference to indicate orientation about the reference axis.

Entrance Angle: the angle between the illumination axis and the reference axis.

Entrance Half-Plane: a half-plane which originates on the reference axis and contains the illumination axis.

Entrance Plane: a plane containing the entrance half-plane.

F-ratio: the relative contribution of a given individual layer to the total optical thickness of a given ORU. The f-ratio for the k-th individual layer is:

$$f_k = \frac{n_k \cdot d_k}{\sum_{m=1}^{N} n_m \cdot d_m},$$

where $1<k<N$, where N is the number of constituent layers in the ORU, where $n_k$ ($n_m$) is the relevant refractive index of k-th (n-th) layer, and $d_k$ ($d_m$) is the physical thickness of layer k (m). The f-ratio of a layer k along a specified optical axis j is denoted $f_{jk}$ and is defined as above but where $n_k$ ($n_m$) is the refractive index of layer k (m) along axis j.

Fractional Bandwidth: the full spectral width (in units of distance such as nm) at half of the maximum height (i.e., half the amplitude) of the band divided by the center wavelength of the band (which bifurcates the full spectral width).

Illumination Axis: a line segment extending between the reference center and the source of illumination.

Light: electromagnetic radiation, whether in the visible, ultraviolet, or infrared portion of the spectrum.

Observation Angle: the angle between the illumination axis and the observation axis.

Observation Axis: a line segment extending between the reference center and a selected observation point.

Optical Repeating Unit ("ORU"): a stack of at least two individual layers which repeats across the thickness of a multilayer optical film, though corresponding repeating layers need not have the same thickness.

Optical thickness: the physical thickness of a given body times its refractive index. In general, this is a function of wavelength and polarization.

Orientation Angle: the dihedral angle between the entrance half-plane and a half-plane originating on the reference axis and containing the datum mark.

Percent reflectance: a dimensionless quantity equal to the ratio of the optical power (e.g. in milliwatts) of light that is specularly reflected from a given object divided by the optical power of light incident on the object, for a collimated incident light beam at a given wavelength. Sometimes shortened to simply "reflectance".

Percent transmission: a dimensionless quantity equal to the ratio of the optical power (e.g. in milliwatts) of light that is transmitted through a given object divided by the optical power of light incident on the object, for a collimated incident light beam at a given wavelength. Sometimes shortened to simply "transmission".

Reference Axis: a line segment extending from the reference center away from the reflective article, and which is ordinarily perpendicular to the reflective article at the reference center.

Reference Center: a point on or near a reflective article which is designated to be the center of the article for specifying its performance.

Reflectance Band: a spectral region of relatively high reflectance bounded on either side by regions of relatively low reflectance.

Skin Layer: a layer that is provided as an outer layer for a multilayer optical film, typically having a physical thickness between 10% and 20% of the sum of the physical thickness of all ORUs of such multilayer film.

Transmission Band: a spectral region of relatively high transmission bounded by spectral regions of relatively low transmission.

Visible Light: light detectable by the unaided human eye, generally in the wavelength range of about 400 to 700 nm.

All U.S. patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A reflective article having a front side and a rear side in relation to an observer, comprising a dichroic reflector proximate the front side and a retroreflective layer proximate the rear side, the retroreflective layer being oriented to reflect light transmitted by the dichroic reflector back through the dichroic reflector, the dichroic reflector comprising alternating layers of at least a first and second polymer, the alternating layers being configured to exhibit a relatively high reflectance for normally incident light within a first spectral range and a relatively low reflectance for normally incident light within a second spectral range.

2. The article of claim 1, wherein at least the first polymer layers are birefringent.

3. The article of claim 2, wherein, over a wavelength range of interest, at least two adjacent layers in the dichroic reflector have indices of refraction along an axis perpendicular to a plane of the dichroic reflector which differ by no more than 50% of the maximum in-plane refractive index difference between the two adjacent layers.

4. The article of claim 3, wherein a plurality of pairs of adjacent layers in the dichroic reflector have indices of refraction along the axis perpendicular to the plane of the dichroic reflector which differ by no more than about 20% of the maximum in-plane refractive index difference between the respective pairs of adjacent layers over the wavelength range of interest.

5. The article of claim 4, wherein substantially every pair of adjacent layers in the dichroic reflector has indices of refraction along the axis perpendicular to the plane of the dichroic reflector which are substantially the same.

6. The article of claim 2, wherein the first polymer is selected from the group consisting of: polyethylene naphthalate, and copolymers and blends thereof based upon naphthalene dicarboxylic acid; polyethylene terephthalate, and copolymers and blends thereof based upon terephthalic acid; polybutylene naphthalate, and copolymers and blends thereof based upon naphthalene dicarboxylic acid; and polybutylene terephthalate, and copolymers and blends thereof based upon terephthalic acid.

7. The article of claim 1, wherein the dichroic reflector comprises a plurality of optical repeating units (ORUs) with associated optical thicknesses, the ORUs arranged in a sequence of decreasing optical thickness along a given direction adjacent a sequence of non-decreasing optical thickness.

8. The article of claim 7, wherein the sequence of ORUs arranged in a non-decreasing optical thickness has an optical thickness profile selected from the group consisting of a flat, graded linear, and curved profile.

9. The article of claim 8, wherein the ORUs are arranged in a first and second set of ORUs each having a monotonically decreasing optical thickness profile and at least one set of ORUs having a non-decreasing optical thickness profile.

10. The article of claim 9, wherein the at least one set of ORUs has a curved optical thickness profile.

11. The article of claim 7, wherein at least one of the sequences of ORUs has an optical thickness profile with a nonzero second derivative.

12. The article of claim 11, wherein at least a portion of the first spectral range is at wavelengths greater than 700 nm.

13. The article of claim 12, wherein the first spectral range comprises a reflection band having a full width at half maximum of at least about 50 nm.

14. The article of claim 1, wherein the second spectral range includes most of the range from 400 to 700 nanometers.

15. The article of claim 14, wherein the dichroic reflector has less than 50% reflectance over the second spectral range.

16. The article of claim 15, wherein the dichroic reflector has less than about 20% reflectance from 400 to 700 nm.

17. The article of claim 1, wherein the dichroic reflector has an absorption of no greater than about 1% over the first and second spectral ranges.

18. The article of claim 1, wherein the first and second spectral range are discontinuous and intermeshed to define a series of reflection and transmission bands.

19. The article of claim 18, wherein at least some of the reflection and transmission bands have approximately equal bandwidths.

20. The article of claim 1, wherein the dichroic reflector is selected from the group consisting of a polarizer and a mirror.

21. The article of claim 1, wherein the retroreflective layer exhibits retroreflectance in at least one plane of incidence but not in at least one other plane of incidence.

22. The article of claim 1, wherein the retroreflective layer comprises a structured surface.

23. The article of claim 22, wherein the structured surface includes shapes selected from the group consisting of cube corner elements, linear prisms, and pyramids.

24. The article of claim 22, wherein the retroreflective layer further comprises a seal film covering the structured surface.

25. The article of claim 22, wherein the retroreflective layer further comprises a metallic coating on the structured surface.

26. The article of claim 1, wherein the retroreflective layer comprises beaded sheeting.

27. The article of claim 1, further comprising a protective film covering the dichroic reflector.

28. The article of claim 27, wherein the protective film comprises acrylic.

29. The article of claim 27, further comprising an adhesive layer carried by the retroreflective layer at the rear side of the article.

30. The article of claim 1, wherein the article is substantially nontransmissive.

31. The article of claim 30, wherein the retroreflective layer includes a metallic specularly reflective layer.

32. The article of claim 1, wherein the dichroic reflector is laminated to the retroreflective layer.

33. The article of claim 1, wherein at least a portion of the retroreflective layer is cast and cured on the dichroic reflector.

34. The article of claim 1, wherein the retroreflective layer comprises a glittering cube corner retroreflective sheeting.

35. The article of claim 1, wherein the dichroic reflector comprises a plurality of optical repeating units (ORUs), the ORUs having in one or more first regions of the dichroic reflector a first thickness variation profile that substantially defines a transmission band, the ORUs having in one or more second regions of the dichroic reflector a second thickness variation profile different from the first thickness variation profile that substantially defines a bandedge slope of the transmission band.

* * * * *